(12) United States Patent
Sumi et al.

(10) Patent No.: US 12,011,779 B2
(45) Date of Patent: Jun. 18, 2024

(54) ADDITIVE MANUFACTURING APPARATUS, ADDITIVE MANUFACTURING SYSTEM, ADDITIVE MANUFACTURING METHOD, STORAGE MEDIUM, AND LEARNING DEVICE

(71) Applicant: Mitsubishi Electric Corporation, Tokyo (JP)

(72) Inventors: Nobuyuki Sumi, Tokyo (JP); Shun Kayashima, Tokyo (JP); Kenji Iriguchi, Tokyo (JP); Seiji Uozumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/265,684

(22) PCT Filed: Feb. 24, 2021

(86) PCT No.: PCT/JP2021/006808
§ 371 (c)(1),
(2) Date: Jun. 7, 2023

(87) PCT Pub. No.: WO2022/180673
PCT Pub. Date: Sep. 1, 2022

(65) Prior Publication Data
US 2023/0390865 A1    Dec. 7, 2023

(51) Int. Cl.
*B23K 26/082* (2014.01)
*B23K 26/342* (2014.01)
(Continued)

(52) U.S. Cl.
CPC .......... *B23K 26/082* (2015.10); *B23K 26/342* (2015.10); *B33Y 10/00* (2014.12); *B33Y 30/00* (2014.12); *B33Y 50/02* (2014.12)

(58) Field of Classification Search
CPC .... B23K 26/082; B23K 26/342; B33Y 10/00; B33Y 30/00; B33Y 50/00; B33Y 50/02
See application file for complete search history.

(56) References Cited

U.S. PATENT DOCUMENTS 5,460,758 A * 10/1995 Langer .................. B33Y 10/00
                                                   118/712
6,353,203 B1 * 3/2002 Hokodate ............ B23K 26/032
                                                   219/121.75
(Continued)

FOREIGN PATENT DOCUMENTS

JP    H02-075486 A    3/1990
JP    9-10977 A       1/1997
(Continued)

OTHER PUBLICATIONS

International Search Report and Written Opinion mailed on Apr. 20, 2021, received for PCT Application PCT/ JP2021/006808, filed on Feb. 24, 2021, 8 pages including English Translation.
(Continued)

*Primary Examiner* — Dana Ross
*Assistant Examiner* — Joe E Mills, Jr.
(74) *Attorney, Agent, or Firm* — XSENSUS LLP

(57) ABSTRACT

An additive manufacturing apparatus produces a shaped article by adding a material melted by emission of a beam, to a workpiece. The additive manufacturing apparatus includes a machining head that emits the beam to the workpiece, a feed unit that feeds the material to the workpiece, and a numerical control device, which is a control unit that determines a machining path along which the machining head is caused to move with respect to the workpiece, and outputs a command to move the machining head. The control unit outputs a command to move the machining head along the machining path obtained by correction performed
(Continued)

based on a moving direction of the machining head with respect to the workpiece.

20 Claims, 16 Drawing Sheets

(51) Int. Cl.
  *B33Y 10/00* (2015.01)
  *B33Y 30/00* (2015.01)
  *B33Y 50/02* (2015.01)

(56) References Cited

U.S. PATENT DOCUMENTS

| | | | |
|---|---|---|---|
| 6,639,180 B1* | 10/2003 | De Steur | B23K 26/08 219/121.85 |
| 11,213,916 B2 | 1/2022 | Matsuo et al. | |
| 2017/0087666 A1 | 3/2017 | Sasaki et al. | |
| 2017/0239892 A1* | 8/2017 | Buller | B28B 17/0081 |
| 2019/0351509 A1 | 11/2019 | Kayashima et al. | |
| 2022/0072657 A1 | 3/2022 | Matsuo et al. | |

FOREIGN PATENT DOCUMENTS

| | | |
|---|---|---|
| JP | 2004-322183 A | 11/2004 |
| JP | 2018-171657 A | 11/2018 |
| JP | 2018-192524 A | 12/2018 |
| JP | 6647480 B1 | 2/2020 |
| WO | 2016/151713 A1 | 9/2016 |
| WO | 2019/198212 A1 | 10/2019 |

OTHER PUBLICATIONS

Notice of Reasons for Refusal mailed on Oct. 12, 2021, received for JP Application 2021-532974, 8 pages Including English Translation.

Decision to Grant mailed on Feb. 8, 2022, received for JP Application 2021-532974, 7 pages including English Translation.

* cited by examiner

ADDITIVE MANUFACTURING APPARATUS, ADDITIVE MANUFACTURING SYSTEM, ADDITIVE MANUFACTURING METHOD, STORAGE MEDIUM, AND LEARNING DEVICE

CROSS-REFERENCE TO RELATED APPLICATION

The present application is based on PCT filing PCT/JP2021/006808, filed Feb. 24, 2021, the entire contents of which are incorporated herein by reference.

FIELD

The present disclosure relates to an additive manufacturing apparatus, an additive manufacturing system, an additive manufacturing method, a storage medium, and a learning device, each for producing a three-dimensional shaped article.

BACKGROUND

One known technology for producing a three-dimensional shaped article is additive manufacturing (AM) technology. There are multiple methods for additive manufacturing technology, one of which is a directed energy deposition (DED) method. In the DED method, an additive manufacturing apparatus locally melts a material by a heat source such as a laser beam, an electron beam, or an arc, and deposits a molten product to produce a shaped article. Energy of the heat source is absorbed by the workpiece, which causes a melt pool to be formed at the machining point on the workpiece. The additive manufacturing apparatus brings the melted material into contact with the melt pool to join the melt of the material to the workpiece.

An additive manufacturing apparatus that melts a material by a beam emitted from a machining head may be subjected to interruption of part of the beam emitted toward the machining point by the material fed to the machining point. Interruption of part of the beam causes the distribution of energy received by the workpiece to be asymmetric with respect to the center of the beam, thereby likely causing the center of the formed melt pool to be deviated from the center of the beam. A deviation of the center of the melt pool causes the position of deposition of the molten product to also be deviated. A deviation of the position of deposition of the molten product causes the shaped article to have a shape deviated from the design shape.

Patent Literature 1 discloses a machining apparatus that supplies a material in powder form from a machining head to a melt pool to produce a shaped article, in which the position where the material is to be supplied is adjusted depending on the moving direction of the machining head.

CITATION LIST

Patent Literature

Patent Literature 1: WO 2016/151713 A

SUMMARY

Technical Problem

However, an additive manufacturing apparatus is not capable of correcting a deviation of the position of deposition of the molten product even when the position where the material is to be supplied is adjusted as is done in the machining apparatus according to Patent Literature 1 given above. The technology of Patent Literature 1 given above thus presents a problem in that the additive manufacturing apparatus is difficult to produce a shaped article with high shape accuracy.

The present disclosure has been made in view of the foregoing, and it is an object of the present disclosure to provide an additive manufacturing apparatus capable of producing a shaped article with high shape accuracy.

Solution to Problem

To solve the problem and achieve the object described above, an additive manufacturing apparatus according to the present disclosure is an additive manufacturing apparatus that produces a shaped article by adding, to a workpiece, a material melted by emission of a beam. An additive manufacturing apparatus according to the present disclosure includes a machining head that emits the beam to the workpiece, a feed unit that feeds the material to the workpiece, and a control unit that determines a machining path along which the machining head is caused to move with respect to the workpiece, and outputs a command to move the machining head. The control unit outputs a command to move the machining head along the machining path obtained by correction performed based on a moving direction of the machining head with respect to the workpiece.

Advantageous Effects of Invention

An additive manufacturing apparatus according to the present disclosure is advantageous in capability of producing a shaped article with high shape accuracy.

DESCRIPTION OF EMBODIMENTS

An additive manufacturing apparatus, an additive manufacturing system, an additive manufacturing method, a storage medium, and a learning device according to embodiments will be described in detail below with reference to the drawings.

First Embodiment

Figure 1:
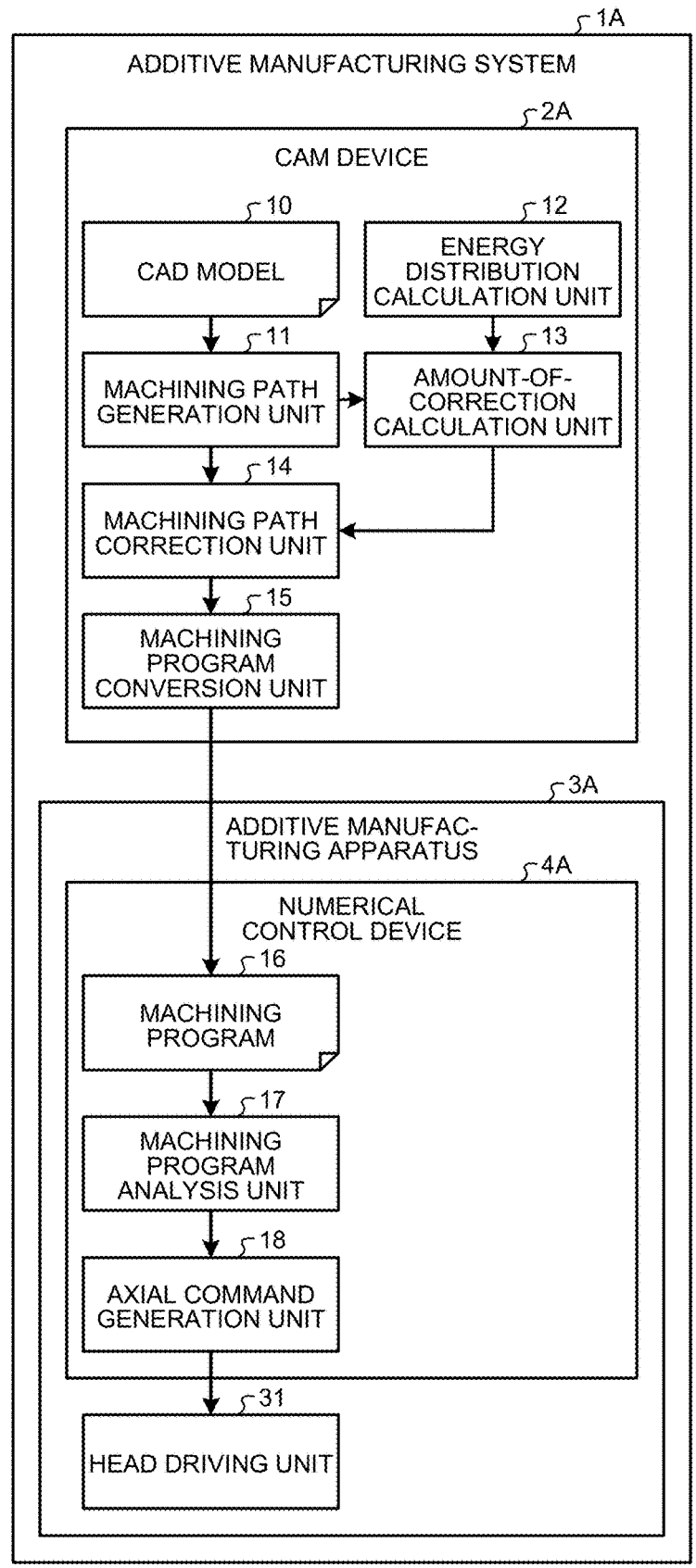
FIG. 1 is a diagram illustrating a configuration of an additive manufacturing system according to a first embodiment.

FIG. 1 is a diagram illustrating a configuration of an additive manufacturing system 1A according to a first embodiment. The additive manufacturing system 1A includes a computer-aided manufacturing (CAM) device 2A, which is a machining program generation device, and an additive manufacturing apparatus 3A.

The CAM device 2A generates a machining program 16 based on a computer-aided design (CAD) model 10. The CAM device 2A is a computer system including CAM software installed therein, where the CAM software is a machining program generation program. The CAD model 10 is geometrical data specifying the shape of a shaped article. The additive manufacturing apparatus 3A is a machine tool for producing a shaped article having a three-dimensional shape through additive manufacturing. The additive manufacturing apparatus 3A includes a numerical control device 4A, which is a control unit. The numerical control device 4A controls the additive manufacturing apparatus 3A according to the machining program 16.

Figure 2:
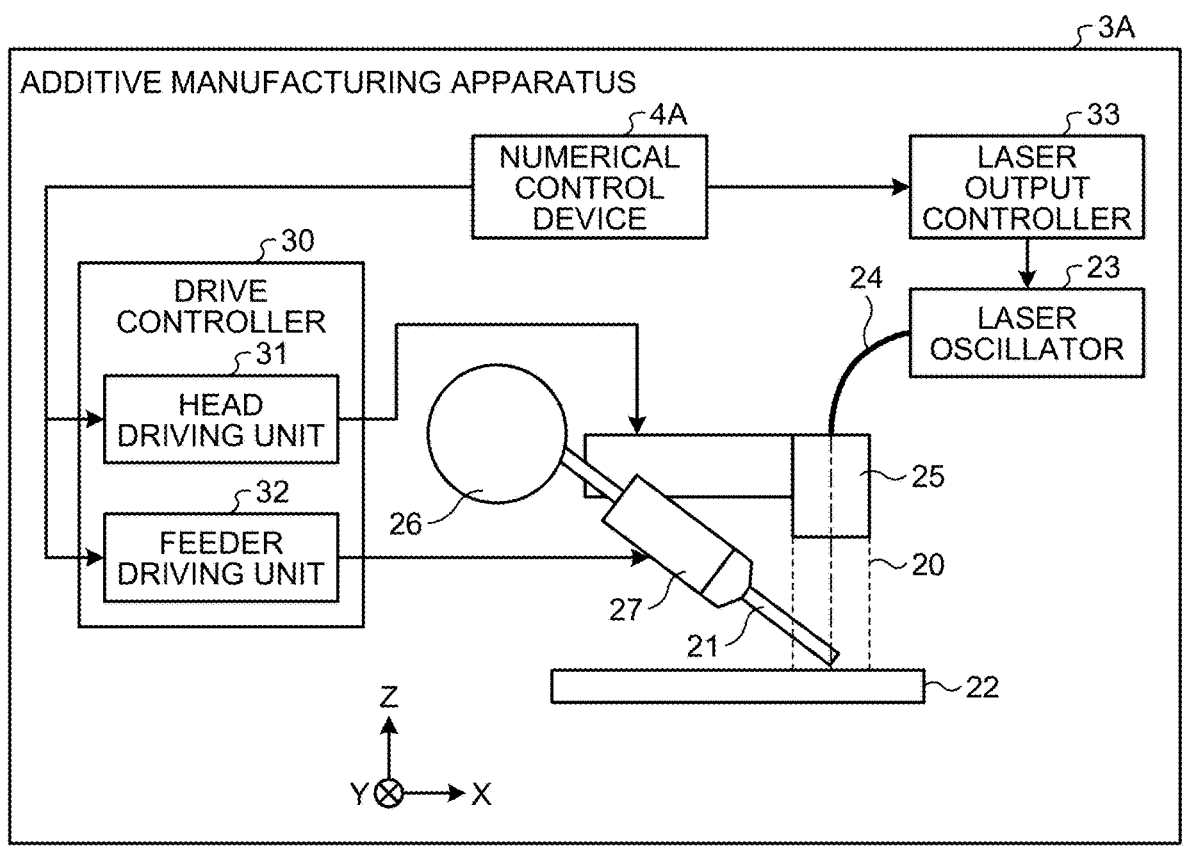
FIG. 2 is a diagram illustrating a configuration of an additive manufacturing apparatus included in the additive manufacturing system according to the first embodiment.

FIG. 2 is a diagram illustrating a configuration of the additive manufacturing apparatus 3A included in the additive manufacturing system 1A according to the first embodiment. The additive manufacturing apparatus 3A produces a shaped article by adding a material melted by emission of a beam, to a workpiece. In the first embodiment, the beam serving as a heat source is a laser beam 20, and the material is a wire 21 made of metal.

The additive manufacturing apparatus 3A is an additive manufacturing apparatus that uses a DED method. Note that the heat source is not limited to the laser beam 20. The heat source may be a beam other than the laser beam 20, and may be an electron beam. The heat source may otherwise be an arc rather than a beam. The material is not limited to the wire 21, and may be a powder of metal.

The additive manufacturing apparatus 3A locally melts, by the laser beam 20, a leading end portion of the wire 21 fed onto the workpiece, and brings the molten product of the wire 21 into contact with the workpiece at a machining point to form a bead. A bead is a solidified product of melted material. Energy of the laser beam 20 absorbed at the machining point on the workpiece generates a melt pool at the machining point. The additive manufacturing apparatus 3A moves the machining point while feeding the wire 21 onto the machining point. The additive manufacturing apparatus 3A brings the bead into contact with the melt pool to join the bead to the workpiece.

The additive manufacturing apparatus 3A produces a shaped article by stacking beads one on top of another on a base material 22. The base material 22 illustrated in FIG. 2 is a plate-shaped material. The base material 22 may be other than a plate-shaped material. The term workpiece refers to an object onto which the melted material is added, and refers to the base material 22 or to the beads on the base material 22. The X-axis, Y-axis, and Z-axis are three axes perpendicular to each other. The X-axis and Y-axis are horizontal axes. The Z-axis is a vertical axis. Beads are stacked along a Z-axis direction. The direction shown by the arrow of the X-axis direction is a positive X direction, and the direction opposite to the positive X direction is a negative X direction. The direction shown by the arrow of the Y-axis direction is a positive Y direction, and the direction opposite to the positive Y direction is a negative Y direction. The direction shown by the arrow of the Z-axis direction is a positive Z direction, and the direction opposite to the positive Z direction is a negative Z direction.

A laser oscillator 23, which is the beam source, outputs the laser beam 20. The laser beam 20 output from the laser oscillator 23 is propagated through a fiber cable 24, which is an optical transmission line, to a machining head 25.

The machining head 25 emits the laser beam 20 to the workpiece. The machining head 25 includes therein a collimating optical system, which collimates the laser beam 20, and a condenser lens, which focuses the laser beam 20 on the workpiece. The collimating optical system and the condenser lens are not illustrated. The laser beam 20 emitted to the workpiece has a center line along the Z-axis direction. The axis of the machining head 25 coincides with the center line of the laser beam 20. The additive manufacturing apparatus 3A includes an actuator that is a drive system for moving the machining head 25 in directions of the X-axis direction, Y-axis direction, and Z-axis direction. The actuator is not illustrated.

The machining head 25 blows shielding gas toward the workpiece. The shielding gas used is argon gas, which is an inert gas. The additive manufacturing apparatus 3A blows the shielding gas to prevent oxidation of the beads and to cool the beads generated. The shielding gas is supplied from a gas cylinder that is the supply source of the shielding gas. The gas cylinder is not illustrated.

A wire spool 26 is the supply source of the wire 21. The wire spool 26 wound with the wire 21 is attached to the additive manufacturing apparatus 3A. A wire feed device 27 is a feed unit that feeds the wire 21 to the workpiece. The wire feed device 27 discharges the wire 21 toward the machining point, and draws back the discharged wire 21 to the wire spool 26. The wire 21 is fed in a direction oblique with respect to the direction of emission of the laser beam 20 from the machining head 25, i.e., with respect to the Z-axis direction. The wire feed device 27 is supported by the machining head 25. The wire feed device 27 moves integrally with the machining head 25. Note that the machining head 25 may support only the nozzle portion of the wire feed device 27, where the wire 21 is discharged toward the machining point. In this manner, at least part of the wire feed device 27 is supported by the machining head 25.

The base material 22 is secured to a machining stage. The machining stage is not illustrated. The additive manufacturing apparatus 3A changes the posture of the base material 22 by driving the machining stage. The additive manufacturing apparatus 3A moves the machining point on the workpiece by changing the posture of the base material 22 and by driving the machining head 25.

The drive controller 30 includes a head driving unit 31, which drives the actuator, and a feeder driving unit 32, which drives the wire feed device 27. The head driving unit 31 drives the machining head 25 by driving the actuator. The drive controller 30 also includes a stage driving unit, which drives the machining stage. The stage driving unit is not illustrated. A laser output controller 33 adjusts a laser output of the laser oscillator 23 by controlling the laser oscillator 23.

The numerical control device 4A outputs some types of commands for controlling the additive manufacturing apparatus 3A. The numerical control device 4A sends an axial command to the head driving unit 31. The axial command is a command for controlling the machining head 25. The numerical control device 4A sends a feed command to the feeder driving unit 32. The feed command is a command for controlling feeding of the wire 21. The numerical control device 4A sends a beam output command to the laser output controller 33. The beam output command is a command for controlling outputting of the beam performed by the beam source. The beam output command is hereinafter referred to as laser output command. The head driving unit 31 drives the actuator according to the axial command to drive the machining head 25. The feeder driving unit 32 drives the wire feed device 27 according to the feed command. The laser output controller 33 controls the laser oscillator 23 according to the laser output command. Note that FIG. 1 illustrates only the numerical control device 4A and the head driving unit 31 among the components of the additive manufacturing apparatus 3A.

The CAM device 2A includes a machining path generation unit 11, which generates a machining path, and a machining program conversion unit 15, which converts the machining path into the machining program 16. The CAM device 2A also includes an energy distribution calculation unit 12, an amount-of-correction calculation unit 13, and a machining path correction unit 14.

The machining path generation unit 11 generates a machining path by analysis of the CAD model 10. The machining path is a path along which the machining head 25 is caused to move with respect to the workpiece. The machining path generation unit 11 outputs data of the machining path to each of the amount-of-correction calculation unit 13 and the machining path correction unit 14. The energy distribution calculation unit 12 calculates the energy distribution of the beam incident on the workpiece. The energy distribution calculation unit 12 outputs a result of calculation of the energy distribution to the amount-of-correction calculation unit 13.

The amount-of-correction calculation unit 13 calculates the amount of correction to the machining path. The amount-of-correction calculation unit 13 outputs a result of calculation of the amount of correction to the machining path correction unit 14. The machining path correction unit 14 corrects the machining path based on the amount of correction calculated by the amount-of-correction calculation unit 13. The machining path correction unit 14 outputs data of the machining path obtained by correction to the machining program conversion unit 15. The machining program conversion unit 15 converts the machining path obtained by correction performed by the machining path correction unit 14 into the machining program 16. Note that calculation of the amount of correction performed by the amount-of-correction calculation unit 13 and correction to the machining path performed by the machining path correction unit 14 will be described in detail later.

The CAM device 2A sends, to the numerical control device 4A, the machining program 16 generated by processing performed in each of the machining path generation unit 11, the energy distribution calculation unit 12, the amount-of-correction calculation unit 13, the machining path correction unit 14, and the machining program conversion unit 15. The numerical control device 4A receives the machining program 16 updated with the correction to the machining path performed by the machining path correction unit 14.

The numerical control device 4A includes a machining program analysis unit 17, which determines a machining path by analysis of the machining program 16 input to the numerical control device 4A. The numerical control device 4A also includes a command generation unit, which generates some types of commands. The command generation unit includes an axial command generation unit 18, a laser output command generation unit, and a feed command generation unit. In FIG. 1, the laser output command generation unit and the feed command generation unit are not illustrated.

The machining program analysis unit 17 analyzes the machining program 16 input to the numerical control device 4A to determine the machining path. The machining program analysis unit 17 outputs data of the machining path to the axial command generation unit 18.

The axial command generation unit 18 generates an axial command based on the machining path. The numerical control device 4A outputs the axial command generated by the axial command generation unit 18 to the head driving unit 31. The axial command is data of an interpolation point group for each unit time on the machining path.

The axial command generated by the axial command generation unit 18 is a command to move the machining head 25 along the machining path obtained by correction performed by the machining path correction unit 14. Thus, the numerical control device 4A generates the axial command to move the machining head 25 along the machining path obtained by correction, based on the machining program 16 obtained from the machining program conversion unit 15.

Figure 3:
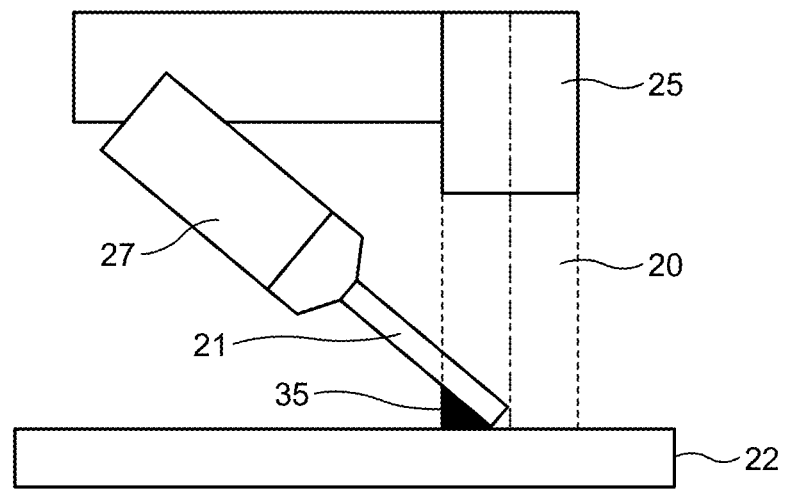
FIG. 3 is a diagram illustrating a machining head and a wire feed device included in the additive manufacturing apparatus of the additive manufacturing system according to the first embodiment.

A machining operation performed by the additive manufacturing apparatus 3A will next be described in detail. FIG. 3 is a diagram illustrating the machining head 25 and the wire feed device 27 included in the additive manufacturing apparatus 3A of the additive manufacturing system 1A according to the first embodiment. FIG. 3 illustrates the machining head 25 and the wire feed device 27 in machining operation as viewed from a position in the negative Y direction with respect to the machining head 25.

In FIG. 3, the wire 21 is fed along an oblique direction between the negative Z direction and the positive X direction. The laser beam 20 emitted from the machining head 25 toward the machining point is partly interrupted by the wire 21 fed from the wire feed device 27. This generates an area 35 where the laser beam 20 is interrupted, in a portion in the negative X direction with respect to the center line of the laser beam 20.

Figure 4:
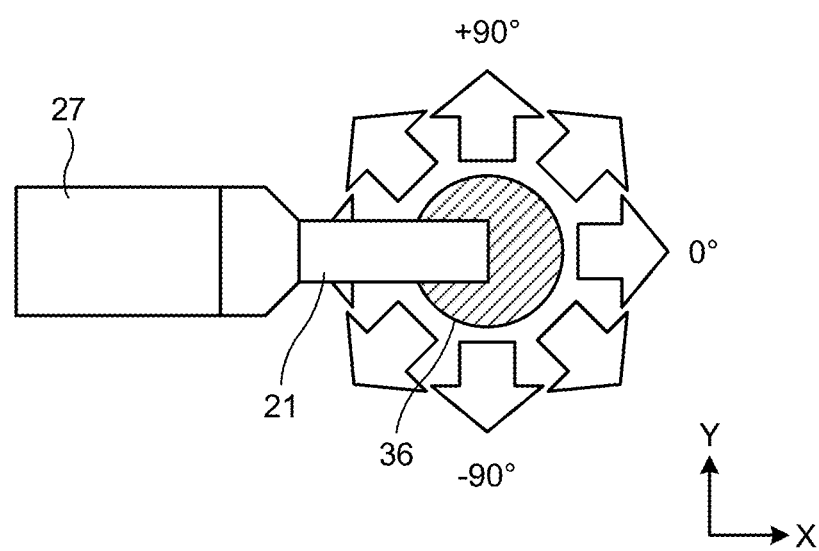
FIG. 4 is a diagram for describing a moving direction of the machining head illustrated in FIG. 3.

FIG. 4 is a diagram for describing a moving direction of the machining head 25 illustrated in FIG. 3. FIG. 4 illustrates the wire feed device 27 and the wire 21 as viewed from a position in the positive Z direction with respect to the machining head 25. In FIG. 4, an open arrow represents an example of moving direction of the machining head 25 relative to the workpiece. FIG. 4 does not illustrate the machining head 25. FIG. 4 further illustrates a spot 36 of the laser beam 20 on the workpiece.

In this respect, the moving direction of the machining head 25 in a two-dimensional direction of the X-axis direction and the Y-axis direction is represented by an angle. The moving direction of the machining head 25 is represented by an angle from +180° to −180° with respect to the positive X direction. The positive X direction is represented by 0°. The positive Y direction is represented by +90°. The negative Y direction is represented by −90°.

Figure 5:
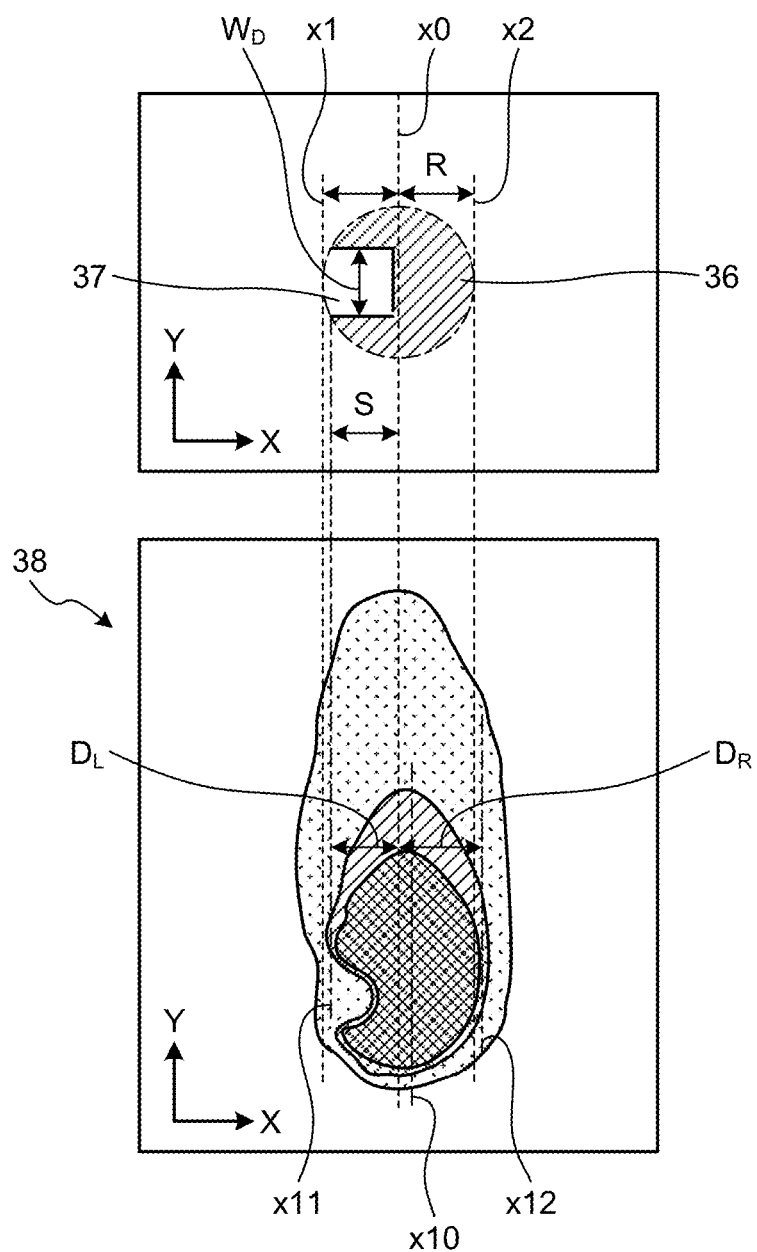
FIG. 5 is a diagram illustrating a spot of a laser beam emitted from the machining head illustrated in FIG. 3 and an example of temperature distribution on the workpiece.

FIG. 5 is a diagram illustrating the spot 36 of the laser beam 20 emitted from the machining head 25 illustrated in FIG. 3 and an example of a temperature distribution 38 of the workpiece. The lower portion of FIG. 5 illustrates a result of simulation of the temperature distribution 38 of the workpiece when the spot 36 illustrated in the upper portion of FIG. 5 is moved in the negative Y direction. The temperature distribution 38 illustrated in FIG. 5 indicates that the temperature increases in the order of the temperature in the open area, the temperature in the dotted area, the temperature in the hatched area, and the temperature in the cross-hatched area. The temperature distribution 38 can be considered as an energy distribution of the laser beam 20 incident on the workpiece.

The wire 21 forms a shadow 37 in the negative X direction from a center x0 in the X-axis direction of the laser beam 20. The shadow 37 has a width in the Y-axis direction that is considered as the same as a width $W_D$ of the wire 21. The spot 36 is an area with the portion of the shadow 37 removed from a circular area having a radius R. Generation of the shadow 37 causes the spot 36 to have a left-right asymmetric shape with respect to the center x0.

A position x1 is the position at the end in the negative X direction, of the above-mentioned circular area. A position x2 is the position at the end in the positive X direction, of the above-mentioned circular area. Generation of the shadow 37 makes a distance S shorter than the radius R, where the distance S is a distance between the end in the negative X direction of the spot 36 and the center x0. The distance S is determined by Equation (1) below.

$$s=\{R^2-(W_D/2)^2\}^{0.5} \quad (1)$$

Due to the shadow 37 generated in a portion in the negative X direction with respect to the center x0, the area of the portion in the negative X direction of the spot 36 with respect to the center x0 is less than the area of the portion in the positive X direction of the spot 36 with respect to the center x0. This causes the workpiece to have high energy in a larger portion in the positive X direction with respect to the center x0. Such a bias in the energy distribution causes the melt pool to have a center x10 in the X-axis direction that is deviated in the positive X direction from the center x0 of the spot 36.

A position x11 is the position at the end in the negative X direction, of the melt pool. A position x12 is the position at the end in the positive X direction, of the melt pool. A relationship $D_L < D_R$ holds, where $D_L$ is the distance between the center x0 and the position x11, and $D_R$ is the distance between the center x0 and the position x12. A relationship $S \approx D_L$ also holds.

Joining the molten product of the wire 21 to the melt pool causes a bead to be formed at the position of the melt pool. A deviation of the center x10 of the melt pool from the center x0 of the laser beam 20 causes the position of formation of a bead to also be deviated. Sequential stacking of such bead results in a deviation of the position of the shaped article from the position specified in the designing phase even when the center x0 of the laser beam 20 is made to coincide with the machining path.

Figure 6:
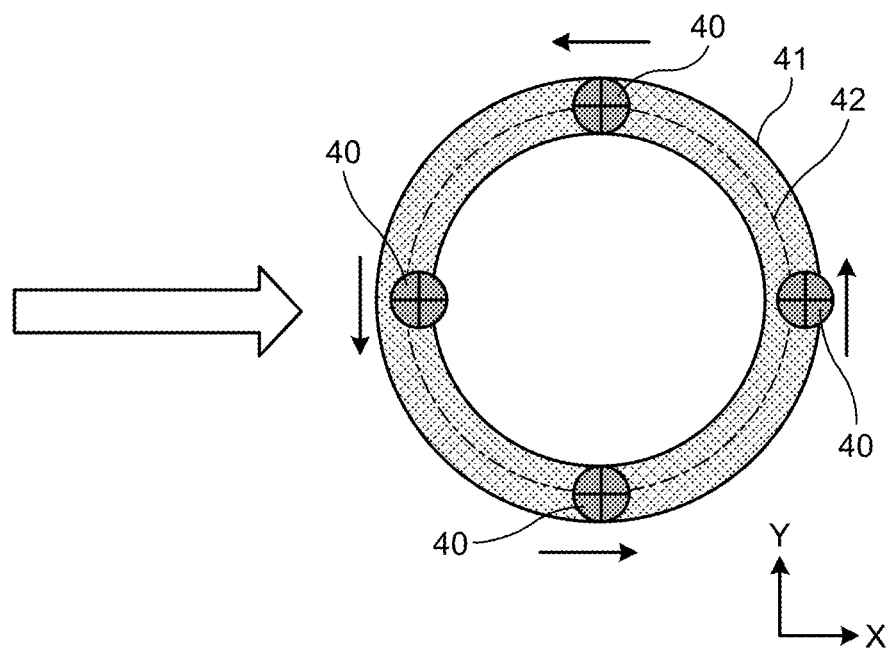
FIG. 6 is a first diagram for describing a positional deviation of a melt pool caused by the temperature distribution illustrated in FIG. 5.
Figure 7:
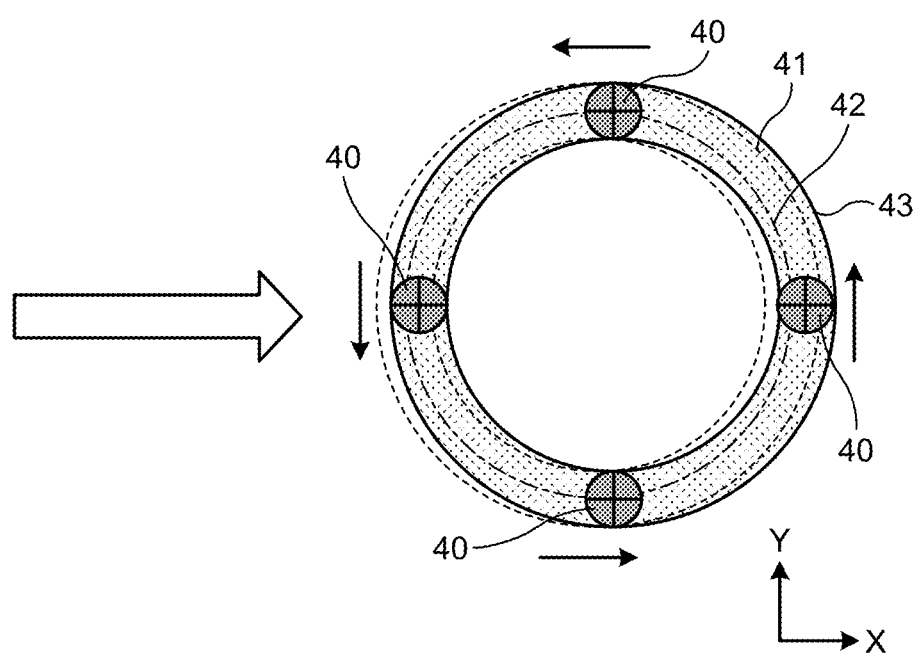
FIG. 7 is a second diagram for describing the positional deviation of the melt pool caused by the temperature distribution illustrated in FIG. 5.

FIG. 6 is a first diagram for describing a positional deviation of the melt pool caused by the temperature distribution 38 illustrated in FIG. 5. FIG. 7 is a second diagram for describing the positional deviation of the melt pool caused by the temperature distribution 38 illustrated in FIG. 5. The open arrows illustrated in FIGS. 6 and 7 represent the direction of feeding of the wire 21.

FIG. 6 illustrates a machining path 42 having a circular shape and the positions of melt pools 40 formed at four positions on the machining path 42. The machining path 42 passes through the center of a target shape 41. In the example illustrated in FIG. 6, the machining head 25 moves counterclockwise along the machining path 42. The target shape 41 is a shape shown by the geometrical data of the shaped article. In the example illustrated in FIG. 6, the center of the melt pool 40 deviates from the machining path 42 in the positive X direction when the machining head 25 moves in the Y-axis directions. In contrast, no deviation occurs between the center of the melt pool 40 and the machining path 42 when the machining head 25 moves in the positive X direction and when the machining head 25 moves in the negative X direction. As described above, a deviation of the center of the melt pool 40 occurs or does not occur depending on the moving direction of the machining head 25 relative to the workpiece.

FIG. 7 illustrates a bead 43 formed when the melt pools 40 are formed as illustrated in FIG. 6. The bead 43 illustrated in FIG. 7 is deviated as a whole in the positive X direction with respect to the target shape 41. Thus, deviations of the positions of some of the melt pools 40 cause the position of the bead 43 to be deviated from the position specified in the designing phase. A deviation of the position of the bead 43 reduces shape accuracy of the shaped article.

The additive manufacturing system 1A according to the first embodiment corrects the machining path in the CAM device 2A. The additive manufacturing apparatus 3A moves the machining head 25 along the machining path obtained by correction. The additive manufacturing system 1A corrects the machining path, and thereby corrects the positions of the melt pools formed on the workpiece. The additive manufacturing system 1A thus reduces the deviation of the position of the shaped article.

Figure 8:
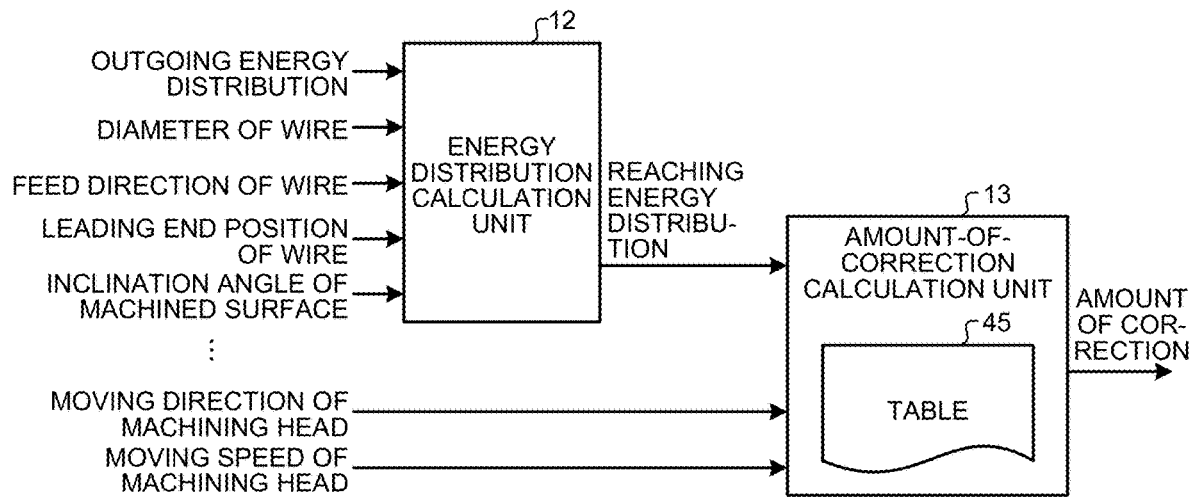
FIG. 8 is a diagram illustrating a configuration for determining the amount of correction to a machining path in a CAM device included in the additive manufacturing system according to the first embodiment.

An operation of correction to the machining path performed by the CAM device 2A will next be described in detail. FIG. 8 is a diagram illustrating a configuration for determining the amount of correction to the machining path in the CAM device 2A included in the additive manufacturing system 1A according to the first embodiment.

The machining path correction unit 14 of the CAM device 2A corrects the machining path based on the amount of correction calculated by the amount-of-correction calculation unit 13. The term "amount of correction" refers to the direction to shift the machining path by making correction and the amount of shift of the machining path to be caused by the correction. The amount-of-correction calculation unit 13 calculates the amount of correction based on input data. The input data includes pieces of data of a reaching energy distribution, of a moving direction of the machining head 25, and of a moving speed of the machining head 25. The reaching energy distribution is an energy distribution of the laser beam 20 incident on the workpiece. The energy distribution calculation unit 12 calculates the reaching energy distribution. FIG. 8 illustrates the energy distribution calculation unit 12 and the amount-of-correction calculation unit 13 illustrated in FIG. 1.

The moving direction of the machining head 25 is a relative direction with respect to the workpiece. The moving speed of the machining head 25 is a relative speed with respect to the workpiece. The additive manufacturing apparatus 3A is a five-axis machining machine capable of translational motion along each of axial directions of X-axis, Y-axis, and Z-axis, and rotational motion around each of two axes. The moving direction of the machining head 25 is the moving direction with respect to each of the five axes. The moving speed of the machining head 25 is the moving speed along each of the five axes. Note that the additive manufacturing apparatus 3A may be a three-axis machining machine capable of translational motion along each axis of X-axis, Y-axis, and Z-axis, or a four-axis machining machine capable of translational motion along each axis of X-axis, Y-axis, and Z-axis, and rotational motion around one axis. The moving direction of the machining head 25 may be a moving direction with respect to each of the three or four axes. The moving speed of the machining head 25 may be a moving speed along each of the three or four axes.

The energy distribution calculation unit 12 receives data of an outgoing energy distribution, data relating to the wire 21, and data of the inclination angle of a machined surface. The outgoing energy distribution is an energy distribution of the laser beam 20 emitted from the machining head 25. The data relating to the wire 21 includes data of the diameter of the wire 21, data of the feed direction of the wire 21, and data of the leading end position of the wire 21. The machined surface is the surface of the workpiece onto which the molten product of the wire 21 is added. The inclination angle of the machined surface is the angle of the machined surface with respect to a reference surface. The reference surface is, for example, an XY-plane. Thus, parameters used in calculation of the reaching energy distribution performed in the energy distribution calculation unit 12 include the outgoing energy distribution, parameters relating to the wire 21, and a parameter relating to the machined surface.

The size of the area in which the shadow 37 is generated depends on the diameter of the wire 21, on the feed direction of the wire 21, on the leading end position of the wire 21, and on the inclination angle of the machined surface. The outgoing energy distribution, the diameter of the wire 21, the feed direction of the wire 21, the leading end position of the wire 21, and the inclination angle of the machined surface are each a parameter affecting the reaching energy distribution. The energy distribution calculation unit 12 can calculate the reaching energy distribution by using the outgoing energy distribution, the parameters relating to the wire 21, and the parameter relating to the machined surface.

The energy distribution calculation unit 12 obtains the data of the outgoing energy distribution from outside the CAM device 2A. The energy distribution calculation unit 12 obtains the data relating to the wire 21 from machining conditions that have been set in the numerical control device 4A. The energy distribution calculation unit 12 obtains the data of the inclination angle of the machined surface from outside the CAM device 2A. The energy distribution calculation unit 12 may obtain the CAD model 10 and data representing the posture of the workpiece to determine the inclination angle of the machined surface based on the CAD model 10 and on the data representing the posture of the workpiece. In this case, the energy distribution calculation unit 12 obtains the data representing the posture of the workpiece from the numerical control device 4A. The energy distribution calculation unit 12 obtains the CAD model 10 from the machining path generation unit 11. Note that the energy distribution calculation unit 12 may receive data relating to another parameter that may affect the reaching energy distribution.

The energy distribution calculation unit 12 determines the reaching energy distribution based on the pieces of data input to the energy distribution calculation unit 12. The energy distribution calculation unit 12 outputs data of the reaching energy distribution to the amount-of-correction calculation unit 13.

The amount-of-correction calculation unit 13 obtains the data of the machining path from the machining path generation unit 11. The amount-of-correction calculation unit 13 determines the data of the moving direction of the machining head 25 and the data of the moving speed of the machining head 25 from the data of the machining path. The amount-of-correction calculation unit 13 may obtain the machining program 16 from the machining program conversion unit 15, and then obtain, based on the machining program 16, the data of the moving direction of the machining head 25 and the data of the moving speed of the machining head 25.

The amount-of-correction calculation unit 13 stores in advance a table 45 summarizing relationships between the input data and the amount of correction. The table 45 stores data associating the input data with the amount of correction. The relationships between the input data and the amount of correction are determined by simulation or by an experiment. The amount-of-correction calculation unit 13 reads the amount of correction corresponding to the input data from the table 45 to calculate the amount of correction.

As described above, the amount-of-correction calculation unit 13 stores information representing relationships between the input data and the amount of correction, and calculates the amount of correction based on the relationships between the input data and the amount of correction. This enables the amount-of-correction calculation unit 13 to calculate the amount of correction by simple processing without performing a simulation upon reception of the input data. The amount-of-correction calculation unit 13 outputs the result of calculation of the amount of correction to the machining path correction unit 14. Note that the information stored in the amount-of-correction calculation unit 13 merely needs to be information representing relationships between the input data and the amount of correction, and is not limited to the table 45. The amount-of-correction calculation unit 13 may store data relating to an equation representing the relationships between the input data and the amount of correction.

The amount-of-correction calculation unit 13 calculates the amount of correction that is based on the reaching energy distribution, on the moving direction of the machining head 25, and on the moving speed of the machining head 25. This means that correction to the machining path performed by the machining path correction unit 14 is correction based on the reaching energy distribution and on the moving direction and the moving speed of the machining head 25. By reception by the numerical control device 4A of the machining program 16 updated with the correction to the machining path, the numerical control device 4A outputs an axial command to move the machining head 25 along the machining path obtained by correction performed based on the reaching energy distribution and on the moving direction and the moving speed of the machining head 25. In addition, the reaching energy distribution calculated by the energy distribution calculation unit 12 is determined in consideration of the inclination angle of the machined surface. The correction to the machining path performed by the machining path correction unit 14 can also be considered as correction based on the moving direction and the moving speed of the machining head 25 and on the inclination angle of the machined surface. Thus, it can also be said that the numerical control device 4A outputs the axial command to move the machining head 25 along the machining path obtained by correction performed based on the moving direction and the moving speed of the machining head 25 and on the inclination angle of the machined surface.

Figure 9:
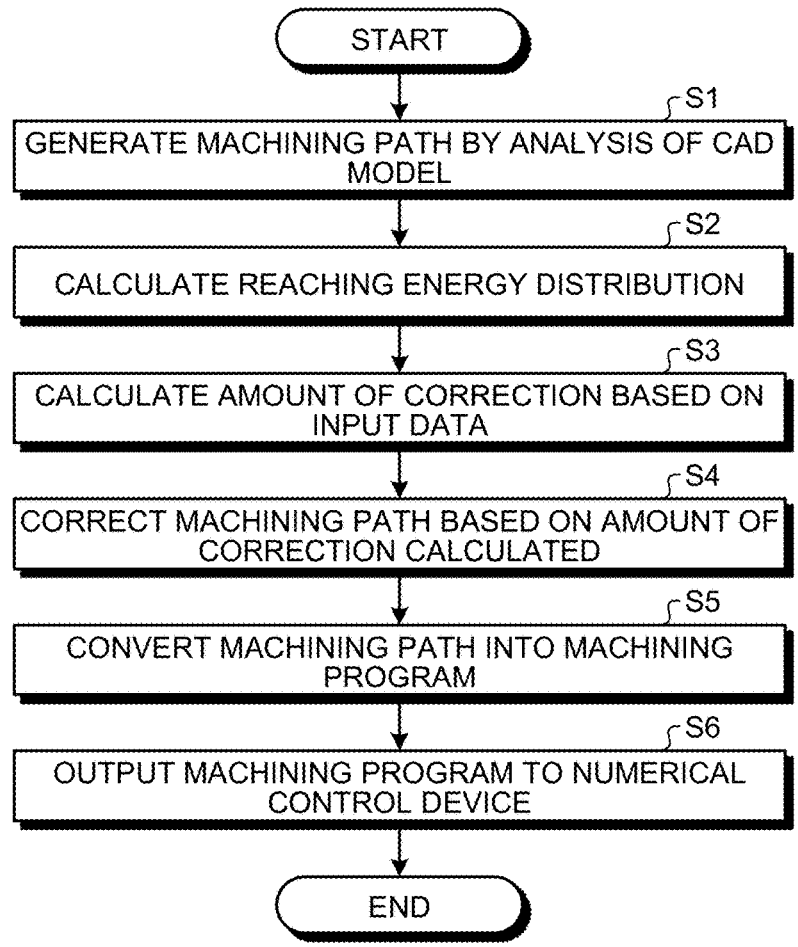
FIG. 9 is a flowchart illustrating a procedure of operation of the CAM device included in the additive manufacturing system according to the first embodiment.

An operation of the CAM device 2A will next be described. FIG. 9 is a flowchart illustrating a procedure of operation of the CAM device 2A included in the additive manufacturing system 1A according to the first embodiment.

At step S1, the CAM device 2A generates a machining path in the machining path generation unit 11 by analysis of the CAD model 10. The machining path generation unit 11 outputs data of the machining path to the machining path correction unit 14. At step S2, the CAM device 2A calculates a reaching energy distribution using the energy distribution calculation unit 12. The energy distribution calculation unit 12 outputs a result of calculation of the reaching energy distribution to the amount-of-correction calculation unit 13.

At step S3, the CAM device 2A calculates the amount of correction based on input data, using the amount-of-correction calculation unit 13. The amount-of-correction calculation unit 13 outputs a result of calculation of the amount of correction to the machining path correction unit 14. At step S4, the CAM device 2A corrects the machining path based on the amount of correction calculated by the amount-of-correction calculation unit 13. The CAM device 2A corrects the machining path using the machining path correction unit 14. The machining path correction unit 14 outputs data of the machining path obtained by correction to the machining program conversion unit 15.

At step S5, the CAM device 2A converts the machining path obtained by correction performed by the machining path correction unit 14 into the machining program 16 in the machining program conversion unit 15. At step S6, the CAM device 2A outputs the machining program 16 generated through the procedure from step S1 to step S5, to the numerical control device 4A. Thus, the CAM device 2A terminates the operation following the procedure illustrated in FIG. 9.

Figure 10:
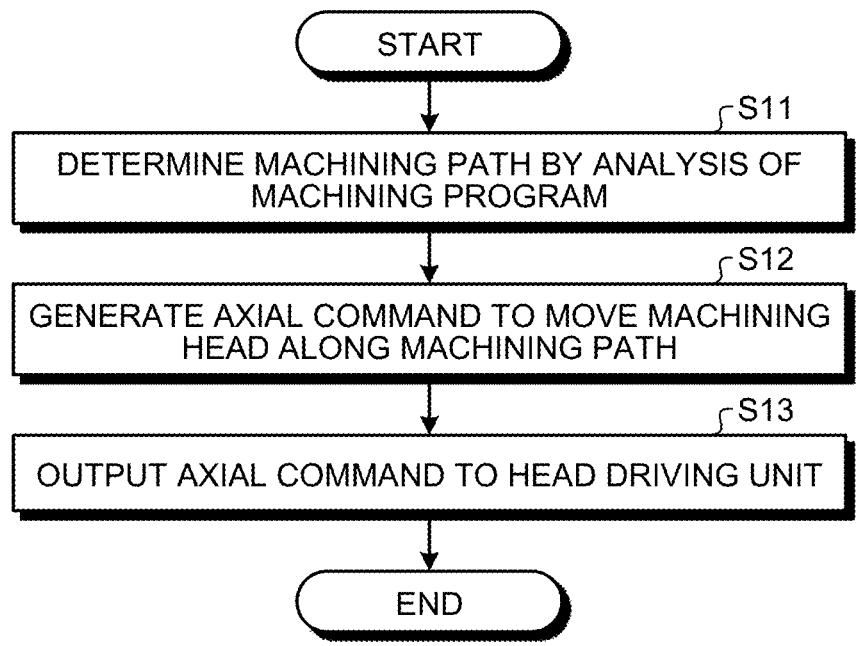
FIG. 10 is a flowchart illustrating a procedure of operation of a numerical control device included in the additive manufacturing system according to the first embodiment.

An operation of the numerical control device 4A will next be described. FIG. 10 is a flowchart illustrating a procedure of operation of the numerical control device 4A included in the additive manufacturing system 1A according to the first embodiment.

At step S11, the numerical control device 4A determines a machining path in the machining program analysis unit 17 by analysis of the machining program 16. The machining program analysis unit 17 outputs data of the machining path determined, to the axial command generation unit 18.

At step S12, the numerical control device 4A generates an axial command to move the machining head 25 along the machining path, using the axial command generation unit 18. At step S13, the numerical control device 4A outputs the axial command generated by the axial command generation unit 18 to the head driving unit 31. Thus, the numerical control device 4A terminates the operation following the procedure illustrated in FIG. 10. As described above, the numerical control device 4A generates the axial command to move the machining head 25 along the machining path obtained by correction, based on the machining program 16 obtained from the machining program conversion unit 15.

Figure 11:
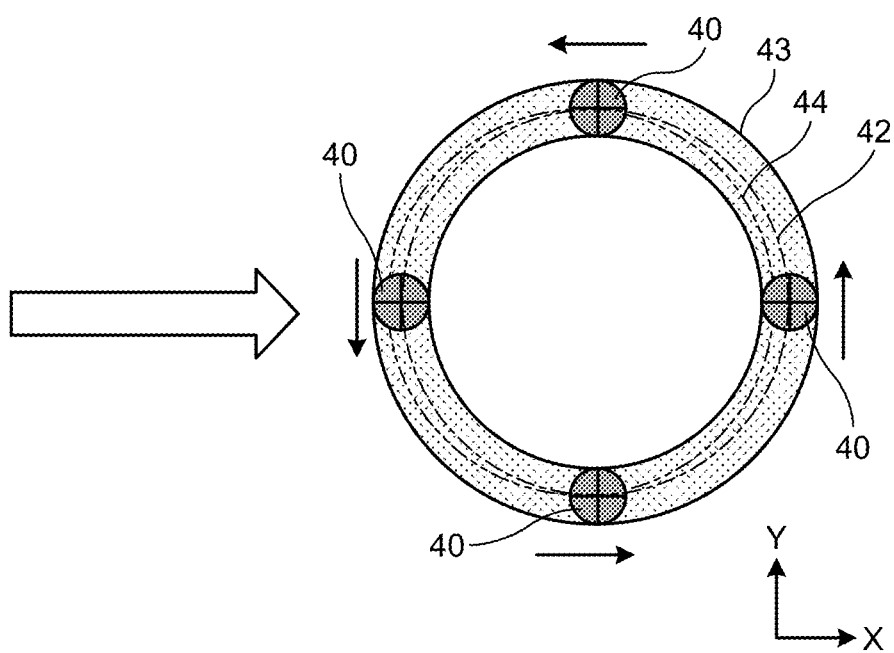
FIG. 11 is a diagram for describing a shaped article to be produced by the additive manufacturing system according to the first embodiment.

FIG. 11 is a diagram for describing a shaped article to be produced by the additive manufacturing system 1A according to the first embodiment. The additive manufacturing apparatus 3A drives the machining head 25 according to the axial command output from the numerical control device 4A to move the machining head 25 along a machining path 44 obtained by correction. The additive manufacturing apparatus 3A moves the machining head 25 along the machining path 44 obtained by correction, and thereby corrects the positions of applicable ones of the melt pools 40 to make the center of the melt pool 40 coincide with the machining path 42 before the correction. The additive manufacturing apparatus 3A can form the bead 43 at the position specified in the designing phase by correcting the positions of applicable ones of the melt pools 40. Because of the capability of forming the bead 43 at the position specified in the designing phase, the additive manufacturing apparatus 3A can produce a shaped article with high shape accuracy.

The correction to the machining path enables the additive manufacturing system 1A to reduce a deviation of the position of a melt pool irrespective of the moving direction of the machining head 25. The additive manufacturing system 1A calculates the amount of correction based on input data including the data of the moving direction of the machining head 25, and corrects the machining path based on the calculated amount of correction. Owing to the correction to the machining path performed in advance to control the additive manufacturing apparatus 3A, the additive manufacturing system 1A can avoid a problem such as a delayed response of the additive manufacturing apparatus 3A.

Adjustment of the energy distribution of the laser beam 20 for left-right symmetry of the energy distribution to reduce the positional deviation of a melt pool would require the additive manufacturing system 1A to have a complex optical configuration. Such adjustment would also require a change in the energy distribution depending on the moving direction of the machining head 25, thereby also requiring the additive manufacturing system 1A to provide complex control of the optical configuration. The correction to the machining path in the first embodiment can be provided by processing easier than processing that would be required for adjustment of the energy distribution of the laser beam 20. The additive manufacturing system 1A can produce a shaped article with high shape accuracy in a simpler configuration and by simpler processing than those when the energy distribution is adjusted.

The additive manufacturing system 1A calculates the amount of correction based on the input data to correct the machining path, and can thus correct the position of a melt pool without using an image of the melt pool. This eliminates the need for the additive manufacturing system 1A to include an imaging device for obtaining an image of the melt pool and to perform processing on the image obtained. This enables the additive manufacturing system 1A to reduce a positional deviation of the shaped article in a simpler configuration and by simpler processing than those when an image of a melt pool is to be used. This enables the additive manufacturing system 1A to provide control with higher responsivity than responsivity when a result of image processing is to be fed back to driving of the actuator.

Note that the additive manufacturing apparatus 3A is not limited to one having the feed direction of the wire 21 being oblique with respect to the central axis of the laser beam 20. The additive manufacturing apparatus 3A may be configured to feed the wire 21 coaxially with the laser beam 20. The correction to the machining path using the method of the first embodiment may be applied to a case in which the wire 21 is fed coaxially with the laser beam 20. Also in this case, the additive manufacturing system 1A can produce a shaped article with high shape accuracy.

The bias in the reaching energy distribution on the workpiece may also occur in cases other than the case in which the beam is interrupted by the material. The additive manufacturing system 1A is also capable of reducing a decrease in shape accuracy that may occur when the reaching energy distribution is biased in cases other than the case in which the beam is interrupted by the material.

Figure 12:
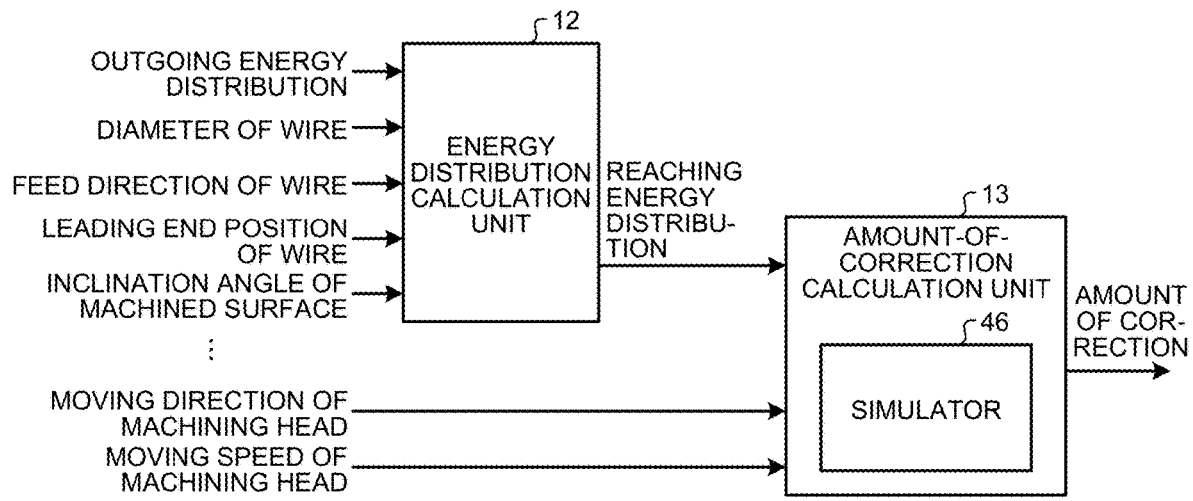
FIG. 12 is a diagram illustrating a first variation of the configuration for determining the amount of correction to the machining path in the CAM device included in the additive manufacturing system according to the first embodiment.

Variations of the configuration for obtaining the amount of correction to the machining path will next be described. FIG. 12 is a diagram illustrating a first variation of the configuration for determining the amount of correction to the machining path in the CAM device 2A included in the additive manufacturing system 1A according to the first embodiment. In the first variation, the amount-of-correction calculation unit 13 includes a simulator 46 in place of the table 45 illustrated in FIG. 8. The simulator 46 calculates the amount of correction by simulation based on the input data. According to the first variation, the amount-of-correction calculation unit 13 is capable of calculating the amount of correction without storing in advance information representing relationships between the input data and the amount of correction.

The CAM device 2A may assume that one or more of the outgoing energy distribution, the diameter of the wire 21, the leading end position of the wire 21, and the inclination angle of the machined surface are constant to omit calculation of the reaching energy distribution. A second variation will next be described with respect to an example configuration when the input data does not include the reaching energy distribution.

Figure 13:
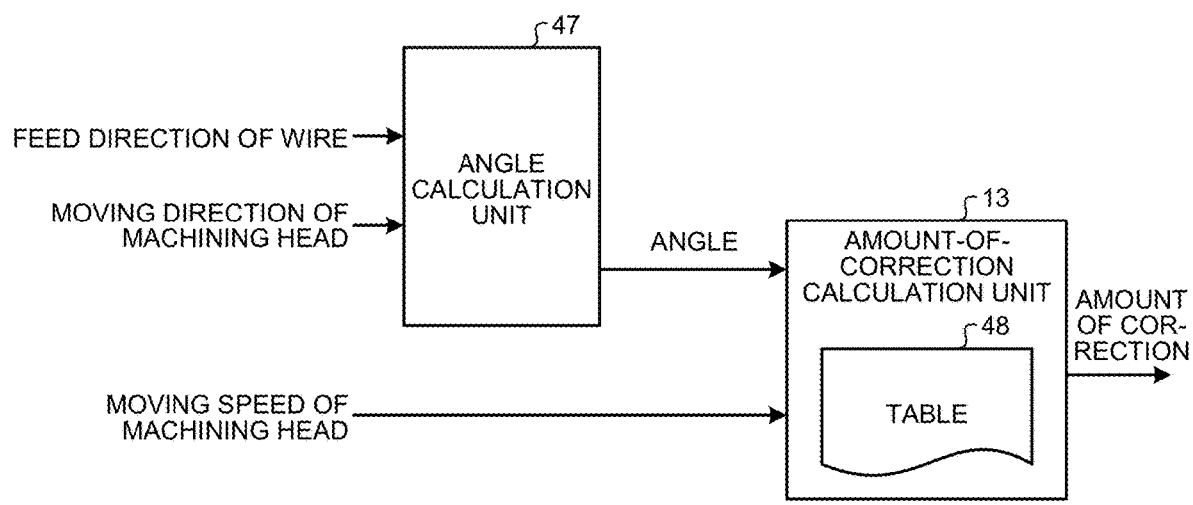
FIG. 13 is a diagram illustrating a second variation of the configuration for determining the amount of correction to the machining path in the CAM device included in the additive manufacturing system according to the first embodiment.

FIG. 13 is a diagram illustrating the second variation of the configuration for determining the amount of correction to the machining path in the CAM device 2A included in the additive manufacturing system 1A according to the first embodiment. In the second variation, the CAM device 2A includes an angle calculation unit 47 in place of the energy distribution calculation unit 12 illustrated in FIG. 8. The second variation is an example of a case in which the outgoing energy distribution, the diameter of the wire 21, the leading end position of the wire 21, and the inclination angle of the machined surface are each constant.

The angle calculation unit 47 receives the data of the feed direction of the wire 21 and the data of the moving direction of the machining head 25. The angle calculation unit 47 calculates the angle formed by the feed direction of the wire 21 and the moving direction of the machining head 25. The angle calculation unit 47 outputs a result of angle calculation to the amount-of-correction calculation unit 13. The angle calculation unit 47 obtains the data of the feed direction of the wire 21 from machining conditions that have been set in the numerical control device 4A. The angle calculation unit 47 obtains the data of the moving direction of the machining head 25 from either the machining path generation unit 11 or the machining program conversion unit 15.

The amount-of-correction calculation unit 13 calculates the amount of correction based on input data. The input data is a set of data of the angle formed by the feed direction of the wire 21 and the moving direction of the machining head 25, and of the moving speed of the machining head 25. The amount-of-correction calculation unit 13 obtains the data of the moving speed of the machining head 25 from either the machining path generation unit 11 or the machining program conversion unit 15.

The amount-of-correction calculation unit 13 stores in advance a table 48 summarizing relationships between the input data and the amount of correction. The table 48 stores data associating the input data with the amount of correction. The relationships between the input data and the amount of correction are determined by simulation or by an experiment. The amount-of-correction calculation unit 13 reads the amount of correction corresponding to the input data from the table 48 to calculate the amount of correction. In the second variation also, the amount-of-correction calculation unit 13 stores information representing the relationships between the input data and the amount of correction, and calculates the amount of correction based on these relationships. The amount-of-correction calculation unit 13 outputs a result of calculation of the amount of correction to the machining path correction unit 14. The amount-of-correction calculation unit 13 is capable of calculating the amount of correction by simple processing without performing a simulation upon reception of the input data.

In the second variation, the amount-of-correction calculation unit 13 calculates the amount of correction that is based on the angle formed by the feed direction of the wire 21 and the moving direction of the machining head 25, and on the moving speed of the machining head 25. Thus, the correction to the machining path performed by the machining path correction unit 14 is correction based on the feed direction of the wire 21 and on the moving direction and the moving speed of the machining head 25. By reception by the numerical control device 4A of the machining program 16 updated with the correction to the machining path, the numerical control device 4A outputs an axial command to move the machining head 25 along the machining path obtained by correction performed based on the feed direction of the wire 21 and on the moving direction and the moving speed of the machining head 25.

Figure 14:
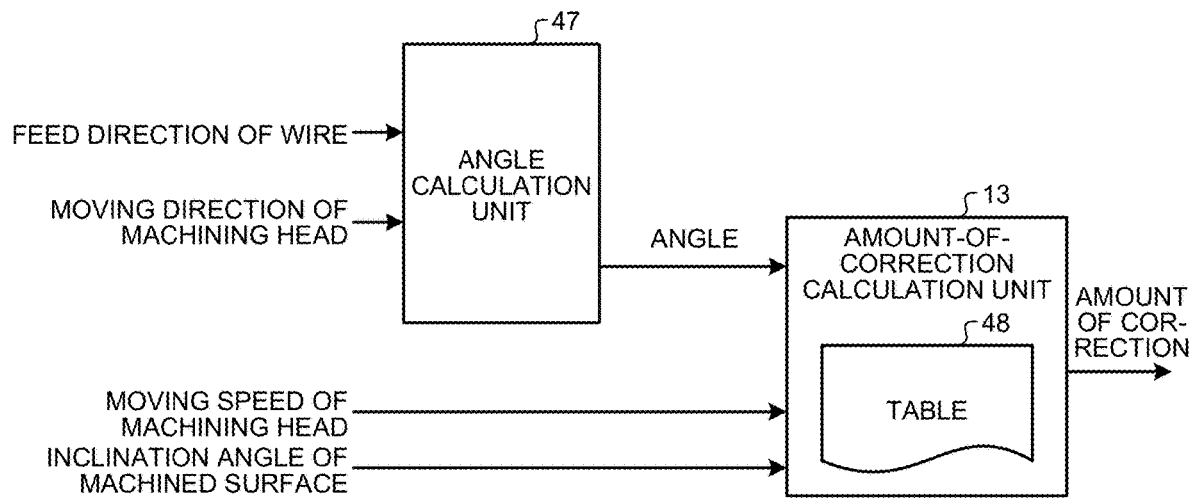
FIG. 14 is a diagram illustrating a third variation of the configuration for determining the amount of correction to the machining path in the CAM device included in the additive manufacturing system according to the first embodiment.

FIG. 14 is a diagram illustrating a third variation of the configuration for determining the amount of correction to the machining path in the CAM device 2A included in the additive manufacturing system 1A according to the first embodiment. The third variation is an example of a case in which the outgoing energy distribution, the diameter of the wire 21, and the leading end position of the wire 21 are each constant.

The angle calculation unit 47 calculates, similarly to the second variation, the angle formed by the feed direction of the wire 21 and the moving direction of the machining head 25. The input data to the amount-of-correction calculation unit 13 is a set of data of the angle formed by the feed direction of the wire 21 and the moving direction of the machining head 25, of the moving speed of the machining head 25, and of the inclination angle of the machined surface. The amount-of-correction calculation unit 13 obtains the data of the inclination angle of the machined surface similarly to the case of the energy distribution calculation unit 12 illustrated in FIG. 8. The amount-of-correction calculation unit 13 calculates the amount of correction based on the input data. The amount-of-correction calculation unit 13 is capable, similarly to the second variation, of calculating the amount of correction by simple processing without performing a simulation upon reception of the input data.

In the third variation, the amount-of-correction calculation unit 13 calculates the amount of correction that is based on the angle formed by the feed direction of the wire 21 and the moving direction of the machining head 25, on the moving speed of the machining head 25, and on the inclination angle of the machined surface. Thus, the correction to the machining path performed by the machining path correction unit 14 is correction based on the feed direction of the wire 21, on the moving direction and the moving speed of the machining head 25, and on the inclination angle of the machined surface. By reception by the numerical control device 4A of the machining program 16 updated with the correction to the machining path, the numerical control device 4A outputs an axial command to move the machining head 25 along the machining path obtained by correction performed based on the feed direction of the wire 21, on the moving direction and the moving speed of the machining head 25, and on the inclination angle of the machined surface. Note that the amount-of-correction calculation unit 13 may receive at least one of the pieces of data of the outgoing energy distribution, of the diameter of the wire 21, and of the leading end position of the wire 21 instead of the data of the inclination angle of the machined surface.

In each of the second variation and the third variation, the information stored in the amount-of-correction calculation unit 13 merely needs to be information representing relationships between the input data and the amount of correction, and is not limited to the table 48. The amount-of-correction calculation unit 13 may store data relating to an equation representing the relationships between the input data and the amount of correction.

According to each of the second variation and the third variation, elimination of the need for calculation of the reaching energy distribution allows the CAM device 2A to calculate the amount of correction by simple processing. Note that the amount-of-correction calculation unit 13 may include the simulator 46 in place of the table 48 also in each of the second variation and the third variation to calculate the amount of correction by simulation based on the input data. This enables the amount-of-correction calculation unit 13 to calculate the amount of correction without storing in advance information representing the relationships between the input data and the amount of correction.

The amount-of-correction calculation unit 13 may calculate the amount of correction by inputting input data into a learned model for use in inference of the amount of correction based on the input data. The input data is the input data illustrated in FIG. 8 or 12, i.e., the pieces of data of the reaching energy distribution, of the moving direction of the machining head 25, and of the moving speed of the machining head 25; or the input data illustrated in FIG. 13, i.e., the pieces of data of the angle formed by the feed direction of the wire 21 and the moving direction of the machining head 25, and of the moving speed of the machining head 25. As described in connection with the third variation, the input data may include at least one of the pieces of data of the inclination angle of the machined surface, of the outgoing energy distribution, of the diameter of the wire 21, and of the leading end position of the wire 21. A fourth variation will next be described with respect to calculation of the amount of correction using a learned model.

Figure 15:
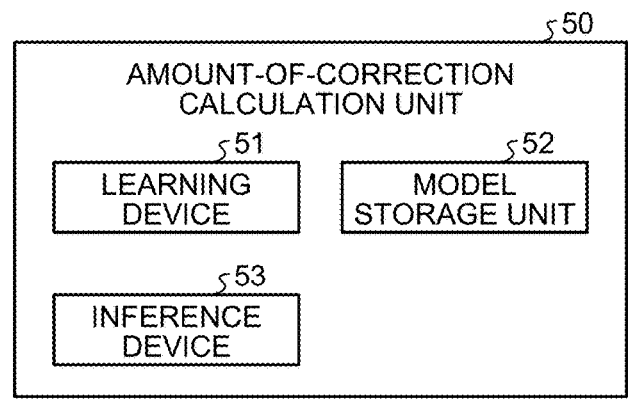
FIG. 15 is a diagram illustrating a fourth variation of the configuration for determining the amount of correction to the machining path in the CAM device included in the additive manufacturing system according to the first embodiment.

FIG. 15 is a diagram illustrating a fourth variation of the configuration for determining the amount of correction to the machining path in the CAM device 2A included in the additive manufacturing system 1A according to the first embodiment. In the fourth variation, the CAM device 2A includes an amount-of-correction calculation unit 50 illustrated in FIG. 15 in place of the amount-of-correction calculation unit 13 illustrated in FIG. 8. The amount-of-correction calculation unit 50 calculates the amount of correction by inputting input data into a learned model for use in inference of the amount of correction based on the input data.

The amount-of-correction calculation unit 50 includes a learning device 51, which generates a learned model by machine learning, a model storage unit 52, which stores the learned model, and an inference device 53, which infers the amount of correction using the learned model. The learning device 51 learns a relationship between the input data and an amount of correction that can provide high shape accuracy.

Figure 16:
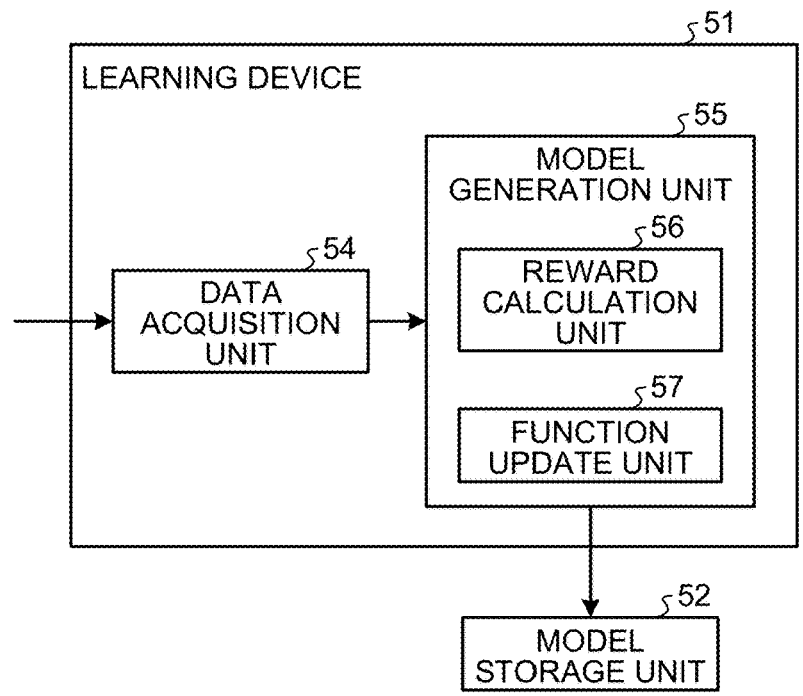
FIG. 16 is a diagram illustrating a configuration of a learning device included in the amount-of-correction calculation unit illustrated in FIG. 15.

FIG. 16 is a diagram illustrating a configuration of the learning device 51 included in the amount-of-correction calculation unit 50 illustrated in FIG. 15. The learning device 51 includes a data acquisition unit 54 and a model generation unit 55. The data acquisition unit 54 obtains the input data and data of the amount of correction calculated based on the input data. The input data is a set of data of the reaching energy distribution, of the moving direction of the machining head 25, and of the moving speed of the machining head 25; or a set of data of the angle formed by the feed direction of the wire 21 and the moving direction of the machining head 25, and of the moving speed of the machining head 25. The input data may include at least one of the pieces of data of the inclination angle of the machined surface, of the outgoing energy distribution, of the diameter of the wire 21, and of the leading end position of the wire 21. The data acquisition unit 54 generates a dataset collectively including the input data and the data of the amount of correction. The data acquisition unit 54 outputs the dataset generated, to the model generation unit 55.

The data acquisition unit 54 also obtains shape error information. The shape error information is information representing a shape error, which is a difference between the geometrical data of the target shape, i.e., the CAD model 10, and the shape of a produced shaped article. The data acquisition unit 54 outputs the shape error information to the model generation unit 55. The data acquisition unit 54 obtains the shape error information from outside the CAM device 2A. Alternatively, the data acquisition unit 54 may obtain the CAD model 10 and measurement data of the shape of the shaped article, and calculate the shape error based on the CAD model 10 and on the measurement data. The data acquisition unit 54 obtains the CAD model 10 from the machining path generation unit 11. The data acquisition unit 54 obtains the measurement data from a sensor such as a shape measuring instrument. The sensor is not illustrated.

The model generation unit 55 generates the learned model using the dataset generated by the data acquisition unit 54. The model generation unit 55 may use any learning algorithm. A case of use of reinforcement learning will herein be described as an example. Reinforcement learning is performed such that an action entity, being an agent, in a certain environment observes the current state and determines what action to take. The agent selects an action to receive a reward from the environment, and thus learns a policy that can maximize the reward, through a set of actions. Typical known methods of reinforcement learning include Q-learning and TD-learning. For example, in Q-learning, an action-value table, which is a typical update equation of an action-value function Q(s, a), is expressed by Equation (2) below. The action-value function Q(s, a) provides an action-value Q, which is the value of an action of selecting an action "a" in an environment "s".

Formula 1:

$$Q(s_t, a_t) \leftarrow Q(s_t, a_t) + \alpha(r_{t+1} + \gamma \max_a Q(s_{t+1}, a_t) - Q(s_t, a_t)) \quad (2)$$

In Equation (2) above, "$s_t$" represents the state of environment at time "t", and "$a_t$" represents the action at time "t". The action "$a_t$" causes the state to change from "$s_t$" to "$s_{t+1}$". The term "$r_{t+1}$" represents the reward receivable by the change in the state from "$s_t$" to "$s_{t+1}$". The factor "$\gamma$" represents the discount factor, and satisfies a relationship of $0 < \gamma \leq 1$. The factor "$\alpha$" represents the learning rate, and satisfies a relationship of $0 < \alpha \leq 1$. In the first embodiment, the action "$a_t$" is the amount of correction. The state "$s_t$" is the input data. The model generation unit 55 learns the best action "$a_t$" in the state "$s_t$" at time "t".

The update equation expressed by Equation (2) above increases the action-value Q when the action-value of the best action "a" at time "t+1" is greater than the action-value Q of the action "a" taken at time "t", and decreases the action-value Q otherwise. In other words, the action-value function Q(s, a) is updated to cause the action-value Q of the action "a" at time "t" to approach the best action-value at time "t+1". This causes the best action-value in a certain environment to sequentially propagate to the action-values in previous environments.

The model generation unit 55 includes a reward calculation unit 56 and a function update unit 57. The reward calculation unit 56 calculates a reward for a combination of the input data and the amount of correction. The function update unit 57 updates the function for calculating the amount of correction based on the input data, based on the reward calculated by the reward calculation unit 56. The function update unit 57 outputs the learned model generated by updating of the function, to the model storage unit 52.

The reward calculation unit 56 calculates the reward "r" based on the shape error information. For example, when the amount of correction associated with a certain piece of the input data has been changed, and the change has caused a reduction in the shape error, the reward calculation unit 56 increases the reward "r". The reward calculation unit 56 increases the reward "r" by giving "1" as the reward value. Note that the reward value is not limited to "1". Alternatively, when the amount of correction associated with a certain piece of the input data has been changed, and the change has caused an increase in the shape error, the reward calculation unit 56 decreases the reward "r". The reward calculation unit 56 decreases the reward "r" by giving "−1" as the reward value. Note that the reward value is not limited to "−1".

Figure 17:
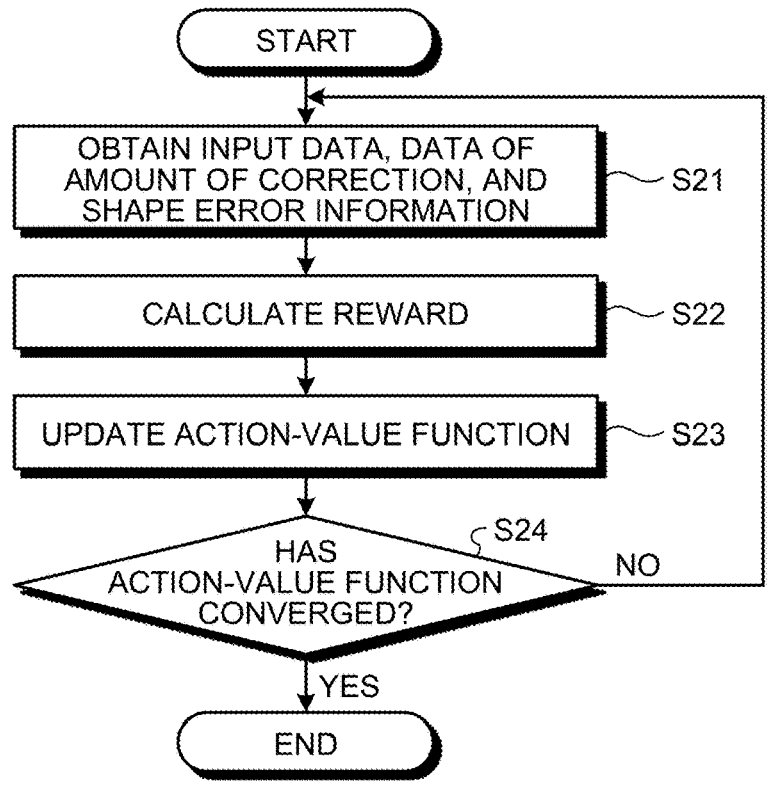
FIG. 17 is a flowchart illustrating a procedure of processing of the learning device illustrated in FIG. 16.

FIG. 17 is a flowchart illustrating a procedure of processing of the learning device 51 illustrated in FIG. 16. A reinforcement learning method for updating the action-value function Q(s, a) will next be described with reference to the flowchart of FIG. 17.

At step S21, the learning device 51 obtains the input data, the data of the amount of correction, and the shape error information. At step S22, the learning device 51 calculates a reward for a combination of the input data and the amount of correction. At step S23, the learning device 51 updates the action-value function Q(s, a) based on the reward. At step S24, the learning device 51 determines whether the action-value function Q(s, a) has converged. The learning device 51 determines that the action-value function Q(s, a) has converged when the action-value function Q(s, a) is no further updated at step S23.

When the learning device 51 determines that the action-value function Q(s, a) has not yet converged (No at step S24), the learning device 51 returns the process to step S21. When the learning device 51 determines that the action-value function Q(s, a) has converged (Yes at step S24), the learning device 51 terminates the learning process of the procedure illustrated in FIG. 17. Note that the learning device 51 may skip the decision at step S24, and return the process to step S21 from step S23 thus to continue learning. The model storage unit 52 stores the action-value function Q(s, a) generated, as the learned model.

Figure 18:
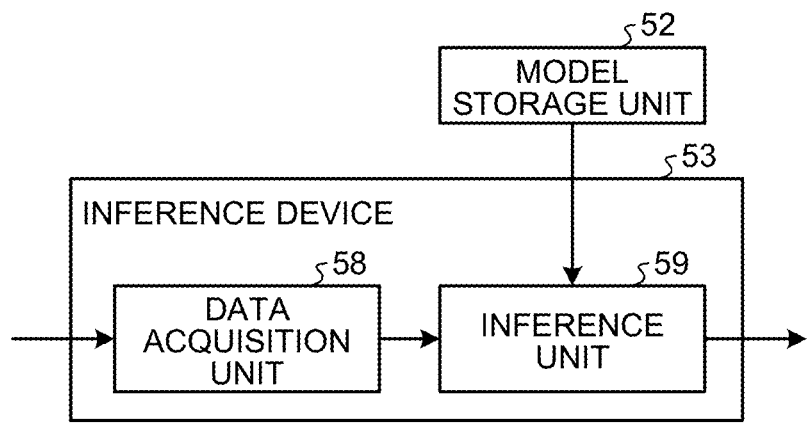
FIG. 18 is a diagram illustrating a configuration of an inference device included in the amount-of-correction calculation unit illustrated in FIG. 15.

FIG. 18 is a diagram illustrating a configuration of the inference device 53 included in the amount-of-correction calculation unit 50 illustrated in FIG. 15. The inference device 53 infers an amount of correction for achieving high shape accuracy based on the learned model and on the input data. The inference device 53 includes a data acquisition unit 58 and an inference unit 59.

The data acquisition unit 58 obtains the input data. The input data is a set of data of the reaching energy distribution, of the moving direction of the machining head 25, and of the moving speed of the machining head 25; or a set of data of the angle formed by the feed direction of the wire 21 and the moving direction of the machining head 25, and of the moving speed of the machining head 25. The data acquisition unit 58 outputs the input data obtained, to the inference unit 59.

The inference unit 59 reads the learned model from the model storage unit 52. The inference unit 59 inputs the input data to the learned model to infer the amount of correction, and outputs a result of inference. The amount-of-correction calculation unit 50 outputs data of the amount of correction, which is the result of inference, to the machining path correction unit 14.

Figure 19:
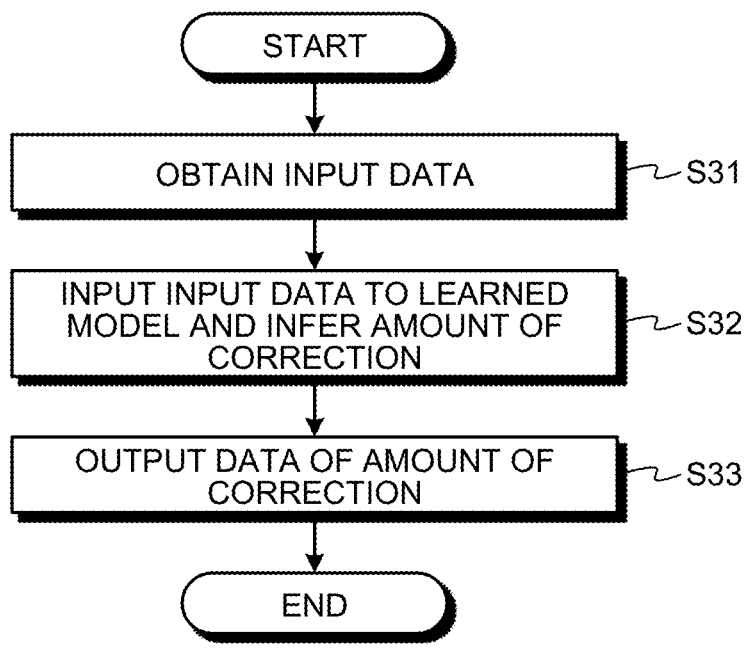
FIG. 19 is a flowchart illustrating a procedure of processing of the inference device illustrated in FIG. 18.

FIG. 19 is a flowchart illustrating a procedure of processing of the inference device 53 illustrated in FIG. 18. At step S31, the inference device 53 obtains the input data. At step S32, the inference device 53 inputs the input data to the learned model, and infers the amount of correction. At step S33, the inference device 53 outputs data of the amount of correction, which is the result of inference, to the machining path correction unit 14. Then, the inference device 53 terminates the process of the procedure illustrated in FIG. 19.

As described above, the amount-of-correction calculation unit 50 generates a learned model for inferring the amount of correction based on the input data, by learning in the learning device 51. The amount-of-correction calculation unit 50 calculates the amount of correction by inputting the input data into the learned model, in the inference device 53. This enables the amount-of-correction calculation unit 50 to calculate an amount of correction for achieving high shape accuracy. The additive manufacturing system 1A can produce a shaped article with high shape accuracy by correcting the machining path based on the amount of correction calculated in the amount-of-correction calculation unit 50.

The fourth variation of the first embodiment has been described in which reinforcement learning is used for the learning algorithm used by the learning device 51. However, a learning method other than reinforcement learning may be used as the learning algorithm. The learning device 51 may perform machine learning using a known learning algorithm other than reinforcement learning, such as for example, deep learning, neural network, genetic programming, inductive logic programming, or support-vector machine.

In the fourth variation of the first embodiment, the learning device 51 is incorporated in the amount-of-correction calculation unit 50. The learning device 51 may be provided outside the amount-of-correction calculation unit 50, but inside the CAM device 2A. The learning device 51 is not limited to a device included in the CAM device 2A, but may be a device external to the CAM device 2A. Moreover, the learning device 51 may even be a device external to the additive manufacturing system 1A. The learning device 51 may also be a device connectable to the CAM device 2A via a network. The learning device 51 may further be a device provided in a cloud server.

The learning device 51 may learn the amount of correction based on datasets generated for multiple CAM devices 2A. The learning device 51 may obtain datasets from multiple CAM devices 2A used in a same site, or may obtain datasets from multiple CAM devices 2A used in sites different from each other. The datasets may be collected from multiple CAM devices 2A operating independently of each other in multiple sites. A new CAM device 2A may be added to a group of dataset source CAM devices after a start of collection of datasets from multiple CAM devices 2A. In addition, one or more of multiple CAM devices 2A may be removed from the group of dataset source CAM devices after a start of collection of datasets from the multiple CAM devices 2A.

The learning device 51 that has performed learning with respect to one CAM device 2A may perform learning with respect to another CAM device 2A other than that CAM device 2A. The learning device 51 that is to perform learning with respect to the other CAM device 2A can update the learned model by performing re-learning with respect to the other CAM device 2A.

The additive manufacturing system 1A according to the first embodiment outputs an axial command to move the machining head 25 along the machining path obtained by correction, in which the CAM device 2A calculates an amount of correction, and the CAM device 2A corrects the machining path based on the calculated amount of correction. Second and third embodiments will next be described with respect to an example in which the numerical control device corrects the axial command, and then outputs the axial command to move the machining head 25 along the machining path obtained by correction.

Second Embodiment

Figure 20:
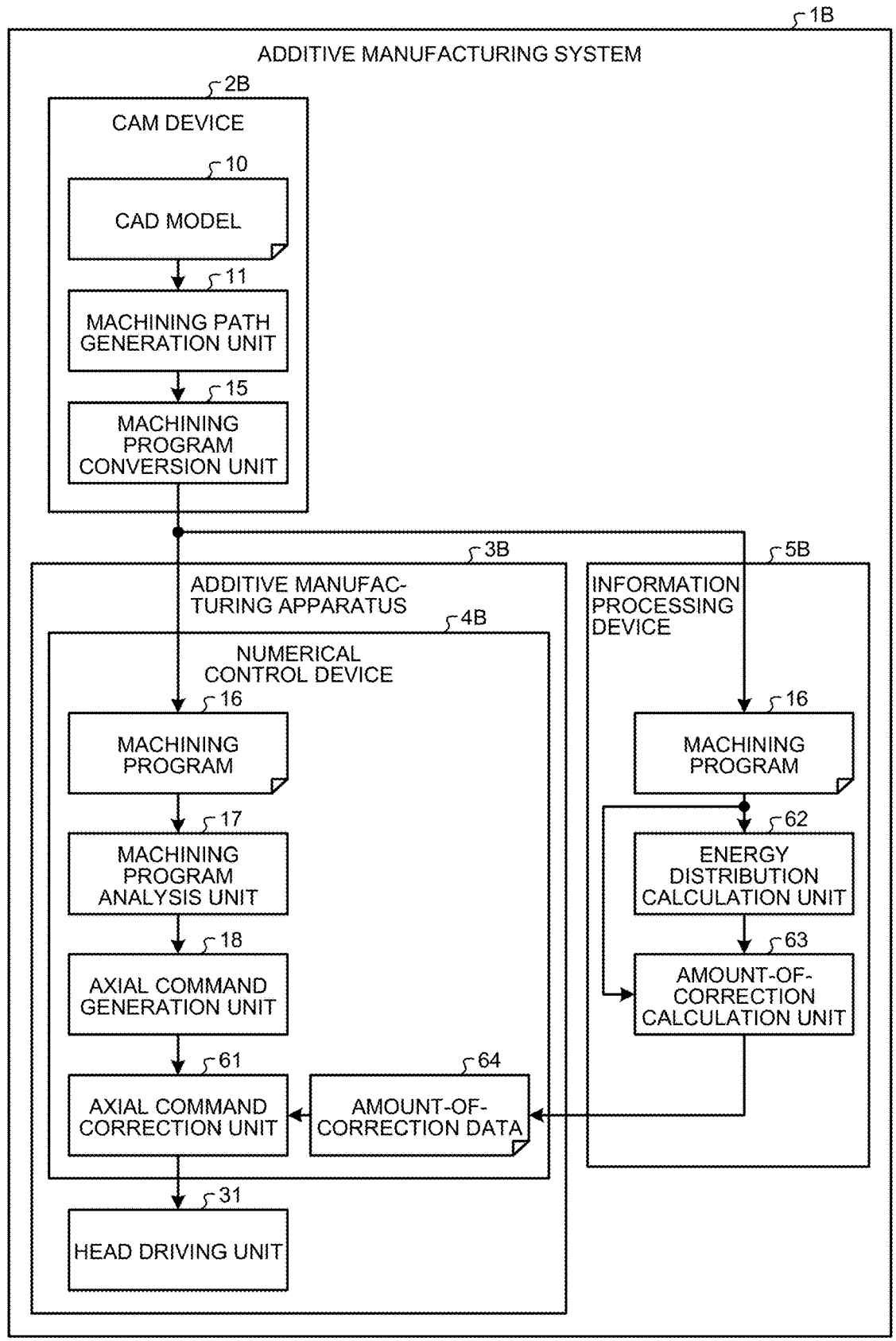
FIG. 20 is a diagram illustrating a configuration of an additive manufacturing system according to a second embodiment.

FIG. 20 is a diagram illustrating a configuration of an additive manufacturing system 1B according to a second embodiment. The additive manufacturing system 1B includes a CAM device 2B, which is a machining program generation device, an additive manufacturing apparatus 3B, and an information processing device 5B. In the second embodiment, components identical to the components of the first embodiment described above are indicated by like reference characters, and the following description primarily describes a configuration different from the configuration of the first embodiment.

The CAM device 2B generates the machining program 16 based on the CAD model 10. The CAM device 2B is a computer system including CAM software installed therein. The additive manufacturing apparatus 3B includes a numerical control device 4B, which is a control unit. The numerical control device 4B controls the additive manufacturing apparatus 3B according to the machining program 16. The information processing device 5B is a computer system that performs processing for calculating the amount of correction. The information processing device 5B communicates with each of the CAM device 2B and the numerical control device 4B.

The CAM device 2B includes the machining path generation unit 11, which generates a machining path, and the machining program conversion unit 15, which converts the machining path into the machining program 16. The machining path generation unit 11 generates the machining path by analysis of the CAD model 10. The machining program conversion unit 15 converts the machining path generated by the machining path generation unit 11 into the machining program 16. The CAM device 2B sends the machining program 16 generated by processing performed in each of the machining path generation unit 11 and the machining program conversion unit 15, to each of the numerical control device 4B and the information processing device 5B.

The additive manufacturing apparatus 3B is configured similarly to the additive manufacturing apparatus 3A of the first embodiment except that the numerical control device 4B is configured differently from the numerical control device 4A. Note that FIG. 20 illustrates only the numerical control device 4B and the head driving unit 31 among the components of the additive manufacturing apparatus 3B.

The numerical control device 4B includes the machining program analysis unit 17, which determines a machining path by analysis of the machining program 16 input to the numerical control device 4B, the axial command generation unit 18, which generates an axial command based on the machining path, and an axial command correction unit 61, which is a command correction unit that corrects the axial command. The numerical control device 4B corrects the axial command in the axial command correction unit 61, and then outputs the axial command to move the machining head 25 along the machining path obtained by correction.

The information processing device 5B includes an energy distribution calculation unit 62 and an amount-of-correction calculation unit 63. The energy distribution calculation unit 62 calculates, similarly to the energy distribution calculation unit 12 of the first embodiment, the energy distribution of the beam incident on the workpiece, i.e., the reaching energy distribution.

The machining program 16 is input to each of the energy distribution calculation unit 62 and the amount-of-correction calculation unit 63. The energy distribution calculation unit 62 obtains data necessary for calculation of the reaching energy distribution, from the machining program 16. The energy distribution calculation unit 62 obtains data relating to the wire 21 from the machining conditions that have been set by the machining program 16. The energy distribution calculation unit 62 also obtains, similarly to the energy distribution calculation unit 12 of the first embodiment, data of the outgoing energy distribution and data of the inclination angle of the machined surface. Note that the energy distribution calculation unit 62 may receive data relating to another parameter that may affect the reaching energy distribution.

The energy distribution calculation unit 62 determines the reaching energy distribution based on the pieces of data input to the energy distribution calculation unit 62. The energy distribution calculation unit 62 outputs data of the reaching energy distribution to the amount-of-correction calculation unit 63.

The amount-of-correction calculation unit 63 obtains data of the moving direction of the machining head and data of the moving speed of the machining head 25 from the machining program 16. The amount-of-correction calculation unit 63 calculates, similarly to the amount-of-correction calculation unit 13 of the first embodiment, the amount of correction based on the pieces of data of the reaching energy distribution, of the moving direction of the machining head 25, and of the moving speed of the machining head 25. The term "amount of correction" refers to the direction to shift the machining path and the amount of shift of the machining path.

Similarly to the amount-of-correction calculation unit 13 illustrated in FIG. 8, the amount-of-correction calculation unit 63 stores the table 45 representing relationships between the input data and the amount of correction, and calculates the amount of correction based on these relationships. The amount-of-correction calculation unit 63 can calculate the amount of correction by simple processing without performing a simulation upon reception of the input data. Note that the information stored in the amount-of-correction calculation unit 63 merely needs to be information representing relationships between the input data and the amount of correction, and is not limited to the table 45. The amount-of-correction calculation unit 63 may store data relating to an equation representing the relationships between the input data and the amount of correction.

The information processing device 5B sends amount-of-correction data 64, which is a result of calculation of the amount of correction, to the numerical control device 4B. The axial command correction unit 61 obtains the amount-of-correction data 64. The axial command correction unit 61 corrects the axial command generated by the axial command generation unit 18, based on the amount-of-correction data 64. That is, the axial command correction unit 61 corrects the axial command based on the amount of correction calculated by the amount-of-correction calculation unit 63.

The axial command correction unit 61 corrects the axial command, and thereby determines the axial command to move the machining head 25 along the machining path obtained by correction. The numerical control device 4B outputs the axial command determined by the axial command correction unit 61 to the head driving unit 31.

The amount-of-correction calculation unit 63 calculates the amount of correction that is based on the reaching energy distribution, on the moving direction of the machining head 25, and on the moving speed of the machining head 25. The axial command output by the axial command correction unit 61 is an axial command to move the machining head 25 along the machining path obtained by correction performed based on the reaching energy distribution and on the moving direction and the moving speed of the machining head 25. Thus, the numerical control device 4B outputs the axial command to move the machining head 25 along the machining path obtained by correction performed based on the reaching energy distribution and on the moving direction and the moving speed of the machining head 25. In addition, the reaching energy distribution calculated by the energy distribution calculation unit 62 is determined in consideration of the inclination angle of the machined surface. The axial command output by the axial command correction unit 61 can also be considered as an axial command to move the machining head 25 along the machining path obtained by correction performed based on the moving direction and the moving speed of the machining head 25 and on the inclination angle of the machined surface. Thus, it can also be said that the numerical control device 4B outputs the axial command to move the machining head 25 along the machining path obtained by correction performed based on the moving direction and the moving speed of the machining head 25 and on the inclination angle of the machined surface.

Figure 21:
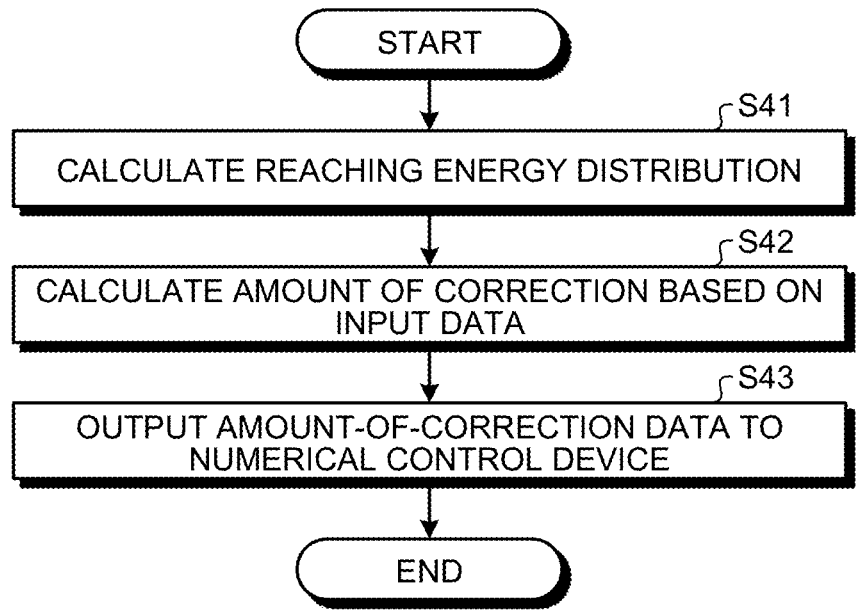
FIG. 21 is a flowchart illustrating a procedure of operation of an information processing device included in the additive manufacturing system according to the second embodiment.

An operation of the information processing device 5B will next be described. FIG. 21 is a flowchart illustrating a procedure of operation of the information processing device 5B included in the additive manufacturing system 1B according to the second embodiment.

At step S41, the information processing device 5B calculates the reaching energy distribution using the energy distribution calculation unit 62. The energy distribution calculation unit 62 outputs a result of calculation of the reaching energy distribution to the amount-of-correction calculation unit 63.

At step S42, the information processing device 5B calculates the amount of correction based on input data, using the amount-of-correction calculation unit 63. The input data is a set of data of the reaching energy distribution, of the moving direction of the machining head 25, and of the moving speed of the machining head 25.

At step S43, the information processing device 5B outputs the amount-of-correction data 64, which is a result of calculation by the amount-of-correction calculation unit 63, to the numerical control device 4B. Thus, the information processing device 5B terminates the operation following the procedure illustrated in FIG. 21.

Figure 22:
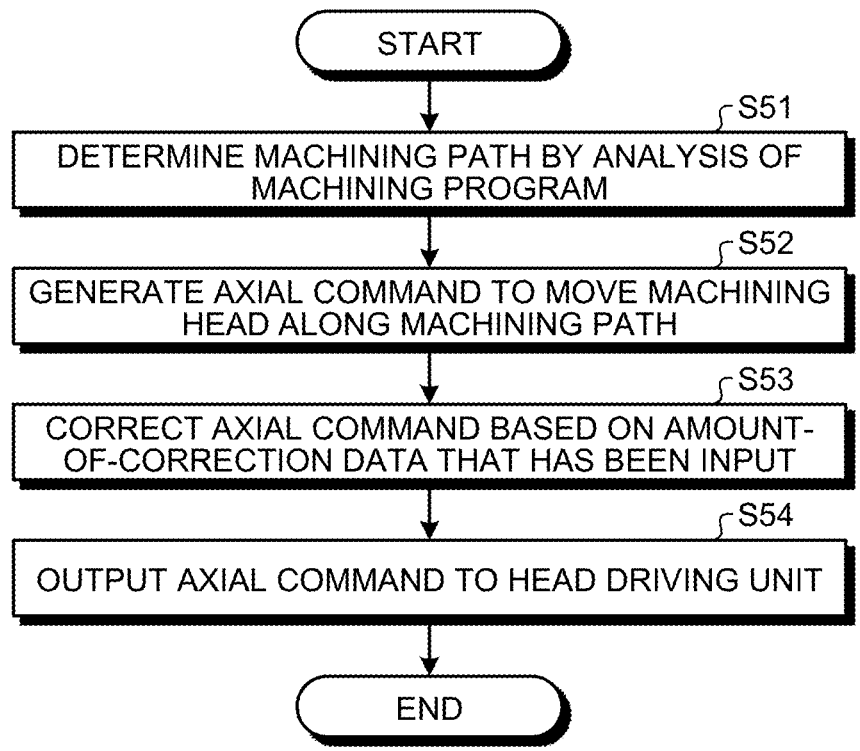
FIG. 22 is a flowchart illustrating a procedure of operation of a numerical control device included in the additive manufacturing system according to the second embodiment.

An operation of the numerical control device 4B will next be described. FIG. 22 is a flowchart illustrating a procedure of operation of the numerical control device 4B included in the additive manufacturing system 1B according to the second embodiment.

At step S51, the numerical control device 4B determines a machining path by analysis of the machining program 16 in the machining program analysis unit 17. The machining program analysis unit 17 outputs data of the machining path determined, to the axial command generation unit 18.

At step S52, the numerical control device 4B generates an axial command to move the machining head 25 along the machining path, using the axial command generation unit 18. The axial command generation unit 18 outputs the axial command generated, to the axial command correction unit 61.

At step S53, the numerical control device 4B corrects the axial command based on the amount-of-correction data 64 input to the numerical control device 4B, in the axial command correction unit 61. At step S54, the numerical control device 4B outputs the axial command obtained by correction performed by the axial command correction unit 61, to the head driving unit 31. As described above, the numerical control device 4B outputs the axial command to move the machining head 25 along the machining path obtained by correction. Thus, the numerical control device 4B terminates the operation following the procedure illustrated in FIG. 22.

The additive manufacturing apparatus 3B drives the machining head 25 according to the axial command output from the numerical control device 4B to move the machining head 25 along the machining path obtained by correction. Similarly to the additive manufacturing apparatus 3A of the first embodiment, the additive manufacturing apparatus 3B is capable of producing a shaped article with high shape accuracy. The correction to the machining path enables the additive manufacturing system 1B to reduce a deviation of the position of a melt pool irrespective of the moving direction of the machining head 25. Owing to the correction to the machining path performed in advance to control the additive manufacturing apparatus 3B, the additive manufacturing system 1B can avoid a problem such as a delayed response of the additive manufacturing apparatus 3B.

Similarly to the case of the first variation of the first embodiment, the additive manufacturing system 1B may calculate the amount of correction by simulation based on the input data using the simulator 46 illustrated in FIG. 12. The amount-of-correction calculation unit 63 may include the simulator 46 illustrated in FIG. 12 in place of the table 45. This enables the amount-of-correction calculation unit 63 to calculate the amount of correction without storing in advance information representing the relationships between the input data and the amount of correction.

Similarly to the case of the second variation or third variation of the first embodiment, the additive manufacturing system 1B may omit calculation of the reaching energy distribution. The information processing device 5B may include the angle calculation unit 47 illustrated in FIG. 13 or 14 in place of the energy distribution calculation unit 62. In this case, elimination of the need for calculation of the reaching energy distribution allows the information processing device 5B to calculate the amount of correction by simple processing. The amount-of-correction calculation unit 63 may include the simulator 46 in place of the table 48 to calculate the amount of correction by simulation based on the input data.

Similarly to the case of the fourth variation of the first embodiment, the amount-of-correction calculation unit 63 may calculate the amount of correction by inputting the input data into the learned model for use in inference of the amount of correction based on the input data.

In the second embodiment, the additive manufacturing system 1B provides correction to the machining path through processing performed by the numerical control device 4B and through processing performed by the information processing device 5B. This eliminates the need for the CAM software to include function for making correction to the machining path, thereby allowing general-purpose CAM software to be used in the additive manufacturing system 1B. Note that, in the second embodiment, the amount of correction may be calculated by a computer system having the CAM software installed therein. In this case, the computer system serving as the CAM device 2B also functions as the information processing device that constitutes the additive manufacturing system 1B. Alternatively, the numerical control device 4B may calculate the amount of correction. The additive manufacturing system 1B is capable of producing a shaped article with high shape accuracy also when a computer system serving as the CAM device 2B or the numerical control device 4B calculates the amount of correction.

Third Embodiment

Figure 23:
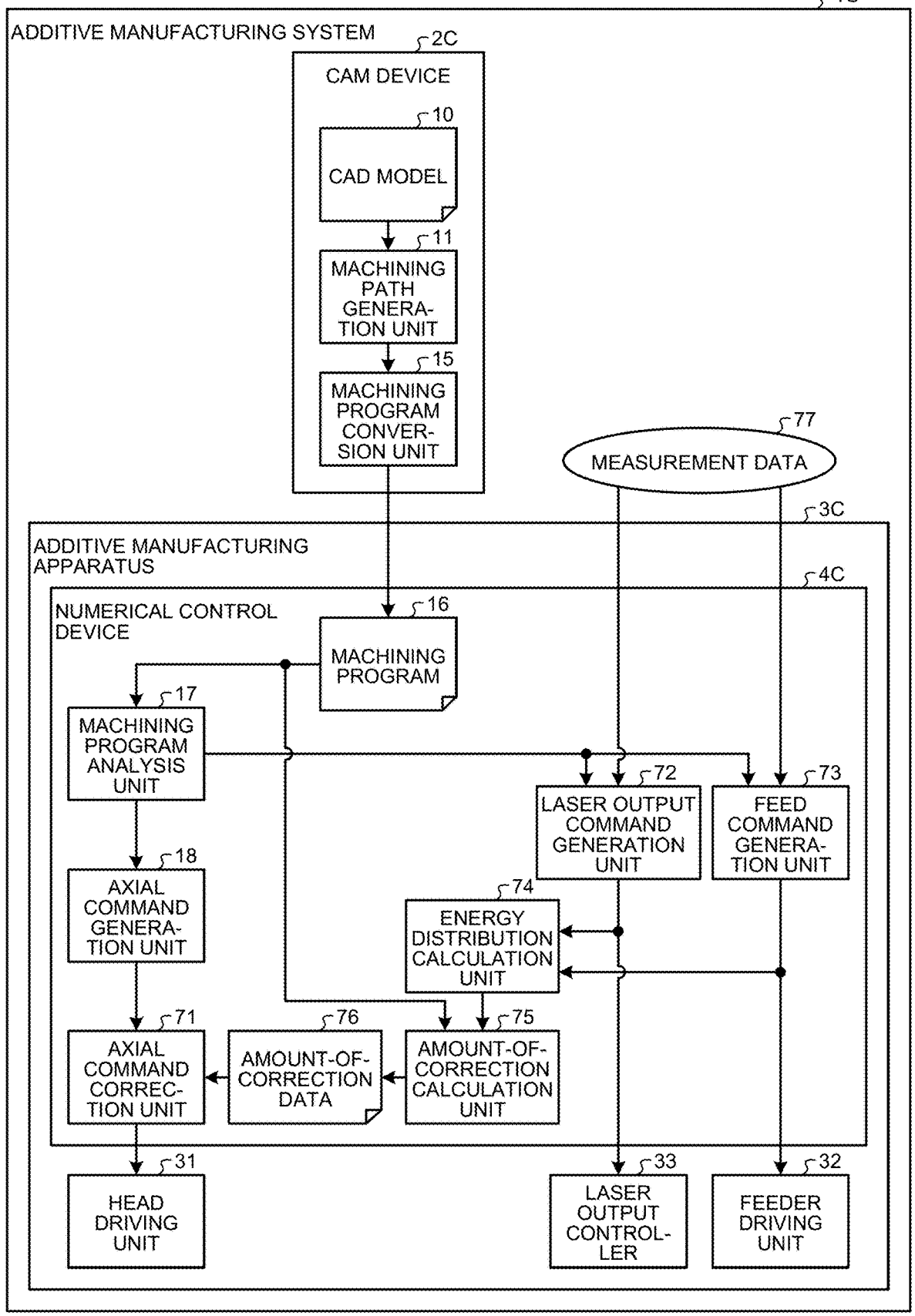
FIG. 23 is a diagram illustrating a configuration of an additive manufacturing system according to a third embodiment.

FIG. 23 is a diagram illustrating a configuration of an additive manufacturing system 1C according to a third embodiment. The additive manufacturing system 1C includes a CAM device 2C, which is a machining program generation device, and an additive manufacturing apparatus 3C. In the third embodiment, components identical to the components of the first or second embodiment described above are indicated by like reference characters, and the following description primarily describes a configuration different from the configuration of the first or second embodiment.

The CAM device 2C generates the machining program 16 based on the CAD model 10. The CAM device 2C is a computer system including the CAM software installed therein. The CAM device 2C is configured similarly to the CAM device 2B illustrated in FIG. 20. The additive manufacturing apparatus 3C includes a numerical control device 4C, which is a control unit. The numerical control device 4C controls the additive manufacturing apparatus 3C according to the machining program 16.

The additive manufacturing apparatus 3C is configured similarly to the additive manufacturing apparatus 3A of the first embodiment except that the numerical control device 4C is configured differently from the numerical control device 4A. Note that FIG. 23 illustrates only the numerical control device 4C, the head driving unit 31, the feeder driving unit 32, and the laser output controller 33 among the components of the additive manufacturing apparatus 3C.

The numerical control device 4C includes the machining program analysis unit 17, which determines a machining path by analysis of the machining program 16 input to the numerical control device 4C, the axial command generation unit 18, which generates an axial command based on the machining path, and an axial command correction unit 71, which is a command correction unit that corrects the axial command. The numerical control device 4C also includes a laser output command generation unit 72, a feed command generation unit 73, an energy distribution calculation unit 74, which calculates the reaching energy distribution, and an amount-of-correction calculation unit 75, which calculates the amount of correction. The axial command generation unit 18, the laser output command generation unit 72, and the feed command generation unit 73 together form a command generation unit. The machining program 16 is input to each of the machining program analysis unit 17 and the amount-of-correction calculation unit 75.

The numerical control device 4C receives measurement data 77, which is a result of measurement of a status of machining operation performed by the additive manufacturing apparatus 3C. The numerical control device 4C adjusts machining conditions based on the measurement data 77 to increase machining accuracy or stabilize machining operation. The numerical control device 4C obtains the measurement data 77 from a sensor unit including various types of sensors. The sensor unit is not illustrated.

The sensor unit includes sensors such as a thermometer, a shape measuring instrument, and a camera. The sensor unit measures the shape or temperature of the shaped article, the temperature of the workpiece, the shape or temperature of a melt pool, and/or the like. The thermometer is a noncontact thermometer such as a radiation thermometer or a thermal imaging camera. The shape measuring instrument is a measuring instrument such as a laser displacement meter, a contact displacement sensor, or an optical coherence tomography (OCT) for providing optical coherence tomography. The shape measuring instrument measures the height of the shaped article along the Z-axis direction, the shape of the shaped article along the X-axis and Y-axis directions, and the like. The camera is a visible-light camera for observing the shaped article or the bead. The sensor unit may include a spectroscope, an acoustic measuring instrument, and/or the like.

The machining program analysis unit 17 obtains information for setting the machining conditions from the machining program 16 to set the machining conditions. The machining program analysis unit 17 may read information on the machining conditions described in the machining program 16, and thus set the machining conditions. The machining program analysis unit 17 outputs information on the machining conditions that has been set, to the laser output command generation unit 72 and to the feed command generation unit 73.

The laser output command generation unit 72 generates a laser output command based on the information on the machining conditions that has been input. The laser output command generation unit 72 adjusts a command value relating to the laser output based on, for example, the result of measurement of the temperature of the melt pool, in the measurement data 77. That is, the laser output command generation unit 72 adjusts the laser output command based on the measurement data 77. The additive manufacturing apparatus 3C provides feedback control of the laser output in this manner. The numerical control device 4C outputs the laser output command generated by the laser output command generation unit 72 to the laser output controller 33.

The feed command generation unit 73 generates a feed command based on the information on the machining conditions that has been input. The feed command generation unit 73 adjusts a command value relating to the feed speed of the wire 21 based on, for example, the result of measurement of the shape of the shaped article, in the measurement data 77. That is, the feed command generation unit 73 adjusts the feed command based on the measurement data 77. The result of measurement of the shape of the shaped article is a measurement value about the height of the shaped article along the Z-axis direction or a measurement value about the shape of the shaped article along the X-axis and Y-axis directions. The additive manufacturing apparatus 3C provides feedback control of the feed speed in this manner. The numerical control device 4C outputs the feed command generated by the feed command generation unit 73 to the feeder driving unit 32.

The energy distribution calculation unit 74 obtains the laser output command output from the laser output command generation unit 72, and determines the outgoing energy distribution based on the laser output command. The energy distribution calculation unit 74 obtains the feed command output from the feed command generation unit 73, and determines the leading end position of the wire 21 based on the feed command. Thus, the energy distribution calculation unit 74 obtains data of the outgoing energy distribution and data of the leading end position of the wire 21. The energy distribution calculation unit 74 also obtains pieces of data of the diameter of the wire 21, of the feed direction of the wire 21, and of the inclination angle of the machined surface similarly to the energy distribution calculation unit 12 illustrated in FIG. 8.

The energy distribution calculation unit 74 calculates the reaching energy distribution based on the data of the outgoing energy distribution, on the data relating to the wire 21, and on the data of the inclination angle of the machined surface. Thus, parameters used in calculation of the reaching energy distribution performed in the energy distribution calculation unit 74 include the outgoing energy distribution, the parameters relating to the wire 21, and the parameter relating to the machined surface. The energy distribution calculation unit 74 outputs data of the reaching energy distribution to the amount-of-correction calculation unit 75.

The parameters used in calculation of the reaching energy distribution include the outgoing energy distribution obtained from the laser output command and the parameters relating to the wire 21 obtained from the feed command. The energy distribution calculation unit 74 thus calculates a reaching energy distribution that takes into consideration the laser output command and the feed command adjusted based on the measurement data 77. The energy distribution calculation unit 74 can thus calculate a reaching energy distribution that reflects a change in machining conditions that has occurred during machining.

The amount-of-correction calculation unit 75 obtains data of the moving direction of the machining head 25 and data of the moving speed of the machining head 25 from the machining program 16. Similarly to the amount-of-correction calculation unit 13 of the first embodiment, the amount-of-correction calculation unit 75 calculates the amount of correction based on the pieces of data of the reaching energy distribution, of the moving direction of the machining head 25, and of the moving speed of the machining head 25. The term "amount of correction" refers to the direction to shift the machining path and the amount of shift of the machining path.

Similarly to the amount-of-correction calculation unit 13 illustrated in FIG. 8, the amount-of-correction calculation unit 75 stores the table 45 representing relationships between the input data and the amount of correction, and calculates the amount of correction based on these relationships. The amount-of-correction calculation unit 75 can calculate the amount of correction by simple processing without performing a simulation upon reception of the input data. Note that the information stored in the amount-of-correction calculation unit 75 merely needs to be information representing relationships between the input data and the amount of correction, and is not limited to the table 45. The amount-of-correction calculation unit 75 may store data relating to an equation representing the relationships between the input data and the amount of correction. The amount-of-correction calculation unit 75 outputs amountof-correction data 76, which is a result of calculation of the amount of correction, to the axial command correction unit 71.

The axial command correction unit 71 corrects the axial command generated by the axial command generation unit 18, based on the amount-of-correction data 76. That is, the axial command correction unit 71 corrects the axial command based on the amount of correction calculated by the amount-of-correction calculation unit 75. The axial command correction unit 71 corrects the axial command, and thereby determines the axial command to move the machining head 25 along the machining path obtained by correction. The numerical control device 4C outputs the axial command determined by the axial command correction unit 71 to the head driving unit 31.

The amount-of-correction calculation unit 75 calculates the amount of correction that is based on the reaching energy distribution, on the moving direction of the machining head 25, and on the moving speed of the machining head 25. The axial command output by the axial command correction unit 71 is an axial command to move the machining head 25 along the machining path obtained by correction performed based on the reaching energy distribution and on the moving direction and the moving speed of the machining head 25. Thus, the numerical control device 4C outputs the axial command to move the machining head 25 along the machining path obtained by correction performed based on the reaching energy distribution and on the moving direction and the moving speed of the machining head 25. In addition, the reaching energy distribution calculated by the energy distribution calculation unit 74 is determined in consideration of the inclination angle of the machined surface. The axial command output by the axial command correction unit 71 can also be considered as an axial command to move the machining head 25 along the machining path obtained by correction performed based on the moving direction and the moving speed of the machining head 25 and on the inclination angle of the machined surface. Thus, it can also be said that the numerical control device 4C outputs the axial command to move the machining head 25 along the machining path obtained by correction performed based on the moving direction and the moving speed of the machining head 25 and on the inclination angle of the machined surface.

Figure 24:
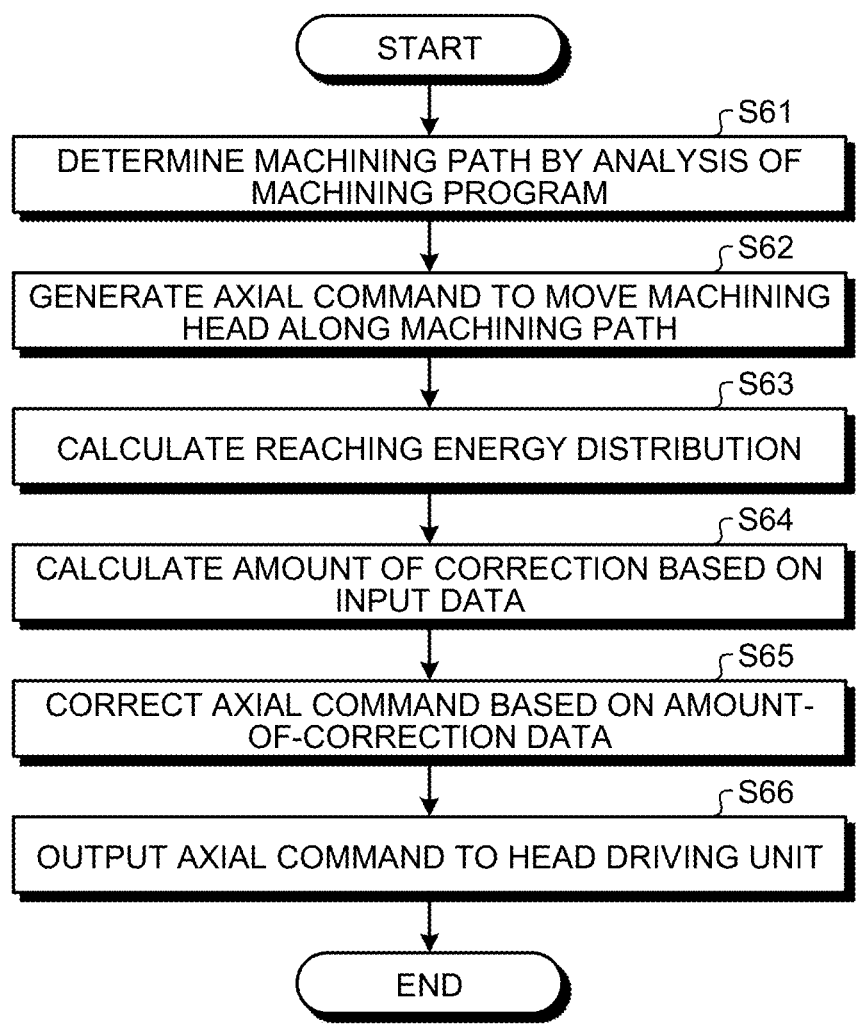
FIG. 24 is a flowchart illustrating a procedure of operation of a numerical control device included in the additive manufacturing system according to the third embodiment.

An operation of the numerical control device 4C will next be described. FIG. 24 is a flowchart illustrating a procedure of operation of the numerical control device 4C included in the additive manufacturing system 1C according to the third embodiment.

At step S61, the numerical control device 4C determines a machining path by analysis of the machining program 16 in the machining program analysis unit 17. The machining program analysis unit 17 outputs data of the machining path determined, to the axial command generation unit 18.

At step S62, the numerical control device 4C generates an axial command to move the machining head 25 along the machining path, using the axial command generation unit 18. The axial command generation unit 18 outputs the axial command generated, to the axial command correction unit 71.

At step S63, the numerical control device 4C calculates the reaching energy distribution using the energy distribution calculation unit 74. The energy distribution calculation unit 74 outputs a result of calculation of the reaching energy distribution to the amount-of-correction calculation unit 75.

At step S64, the numerical control device 4C calculates the amount of correction based on input data, using the amount-of-correction calculation unit 75. The input data is a set of data of the reaching energy distribution, of the moving direction of the machining head and of the moving speed of the machining head 25.

At step S65, the numerical control device 4C corrects the axial command based on the amount-of-correction data 76 in the axial command correction unit 71. At step S66, the numerical control device 4C outputs the axial command obtained by correction performed by the axial command correction unit 71, to the head driving unit 31. As described above, the numerical control device 4C outputs the axial command to move the machining head 25 along the machining path obtained by correction. Thus, the numerical control device 4C terminates the operation following the procedure illustrated in FIG. 24.

The additive manufacturing apparatus 3C drives the machining head 25 according to the axial command output from the numerical control device 4C to move the machining head 25 along the machining path obtained by correction. Similarly to the additive manufacturing apparatus 3A of the first embodiment, the additive manufacturing apparatus 3C is capable of producing a shaped article with high shape accuracy. The correction to the machining path enables the additive manufacturing system 1C to reduce a deviation of the position of a melt pool irrespective of the moving direction of the machining head 25. Owing to the correction to the machining path performed in advance to control the additive manufacturing apparatus 3C, the additive manufacturing system 1C can avoid a problem such as a delayed response of the additive manufacturing apparatus 3C.

Note that the energy distribution calculation unit 74 has been described as calculating the reaching energy distribution based on the laser output command and on the feed command, but is not limited thereto. It is sufficient that the energy distribution calculation unit 74 calculate the reaching energy distribution based on at least one of the laser output command and the feed command. The energy distribution calculation unit 74 calculates a reaching energy distribution that takes into consideration at least one of the laser output command adjusted and the feed command adjusted.

The energy distribution calculation unit 74 has also been described as calculating the reaching energy distribution using a laser output command adjusted based on the measurement data 77 or using a feed command adjusted based on the measurement data 77. However, the energy distribution calculation unit 74 may calculate the reaching energy distribution based on the measurement data 77. The energy distribution calculation unit 74 may determine the moving speed of the machining head 25 from the measurement data 77, and then use data of the moving speed in calculation of the reaching energy distribution. In addition, the energy distribution calculation unit 74 may use data obtained by processing performed in the numerical control device 4C in calculation of the reaching energy distribution. The energy distribution calculation unit 74 may obtain data of the moving direction of the machining head 25 determined through processing performed in the numerical control device 4C, and then use the data of the moving direction in calculation of the reaching energy. The energy distribution calculation unit 74 can obtain data relating to the parameter or parameters as appropriate that may affect the reaching energy distribution, among the commands (which are the laser output command, the feed command, and the axial command), the measurement data 77, and data obtained by processing performed in the numerical control device 4C.

Similarly to the case of the first variation of the first embodiment, the additive manufacturing system 1C may calculate the amount of correction by simulation based on the input data using the simulator 46 illustrated in FIG. 12. The amount-of-correction calculation unit 75 may include the simulator 46 in place of the table 45. This enables the amount-of-correction calculation unit 75 to calculate the amount of correction without storing in advance information representing the relationships between the input data and the amount of correction.

Similarly to the case of the fourth variation of the first embodiment, the amount-of-correction calculation unit 75 may calculate the amount of correction by inputting the input data into the learned model for use in inference of the amount of correction based on the input data.

In the third embodiment, the additive manufacturing system 1C provides correction to the machining path through processing performed by the numerical control device 4C. This eliminates the need for the CAM software to include function for making correction to the machining path, thereby allowing general-purpose CAM software to be used in the additive manufacturing system 1C.

Note that when the CAM device 2A calculates the reaching energy distribution as performed in the additive manufacturing system 1A according to the first embodiment, the energy distribution calculation unit 12 illustrated in FIG. 1 may calculate the reaching energy distribution that takes into consideration at least one of the laser output command adjusted and the feed command adjusted similarly to the energy distribution calculation unit 74. In this case, the energy distribution calculation unit 12 can calculate the reaching energy distribution by obtaining at least one of the laser output command adjusted and the feed command adjusted, from the numerical control device 4A.

In addition, when the information processing device 5B calculates the reaching energy distribution as performed in the additive manufacturing system 1B according to the second embodiment, the energy distribution calculation unit 62 illustrated in FIG. 20 may calculate the reaching energy distribution that takes into consideration at least one of the laser output command adjusted and the feed command adjusted similarly to the energy distribution calculation unit 74. In this case, the energy distribution calculation unit 62 can calculate the reaching energy distribution by obtaining at least one of the laser output command adjusted and the feed command adjusted, from the numerical control device 4B.

Hardware for implementing the numerical control devices 4A, 4B, and 4C of the first through third embodiments will next be described. The numerical control devices 4A, 4B, and 4C can be implemented in hardware having a configuration illustrated in FIG. 25 or 26.

Figure 25:
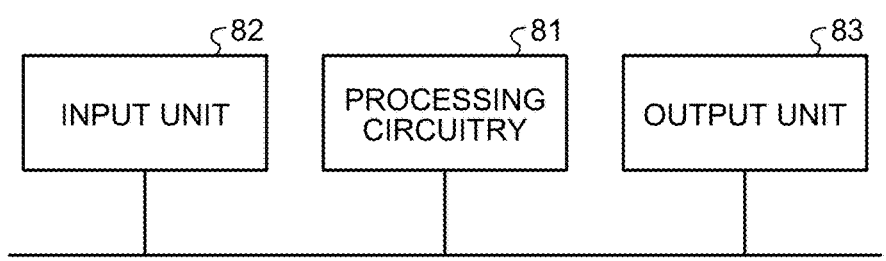
FIG. 25 is a diagram illustrating a first example configuration of hardware for implementing the numerical control devices of the additive manufacturing systems according to the first through third embodiments.

FIG. 25 is a diagram illustrating a first example configuration of hardware for implementing the numerical control devices 4A, 4B, and 4C of the additive manufacturing systems 1A, 1B, and 1C according to the first through third embodiments. FIG. 25 illustrates a configuration when a main portion of each of the numerical control devices 4A, 4B, and 4C is implemented in processing circuitry 81, which is a dedicated hardware element. The main portion of the numerical control device 4A is a set of the machining program analysis unit 17 and the axial command generation unit 18. The main portion of the numerical control device 4B is a set of the machining program analysis unit 17, the axial command generation unit 18, and the axial command correction unit 61. The main portion of the numerical control device 4C is a set of the machining program analysis unit 17, the axial command generation unit 18, the axial command correction unit 71, the laser output command generation unit 72, the feed command generation unit 73, the energy distribution calculation unit 74, and the amount-of-correction calculation unit 75.

The processing circuitry 81 is, for example, an application specific integrated circuit (ASIC), a field programmable gate array (FPGA), or a circuit in combination thereof. Note that the example illustrated in FIG. 25 assumes that the main portions of the numerical control device 4A, 4B, or 4C are implemented in a single type of the processing circuitry 81, but these main portions are not limited thereto. The hardware may include multiple processing circuitries 81 to enable the main portions of the numerical control device 4A, 4B, or 4C to be implemented in different processing circuitries 81.

An input unit 82 is a circuit for receiving an input signal for the numerical control device 4A, 4B, or 4C from an external device. In the numerical control device 4A, the input unit 82 receives the machining program 16. In the numerical control device 4B, the input unit 82 receives the machining program 16 and the amount-of-correction data 64. In the numerical control device 4C, the input unit 82 receives the machining program 16 and the measurement data 77. An output unit 83 is a circuit for outputting a signal generated by the numerical control device 4A, 4B, or 4C to an external device. The output unit 83 outputs the axial command, the laser output command, and the feed command.

Figure 26:
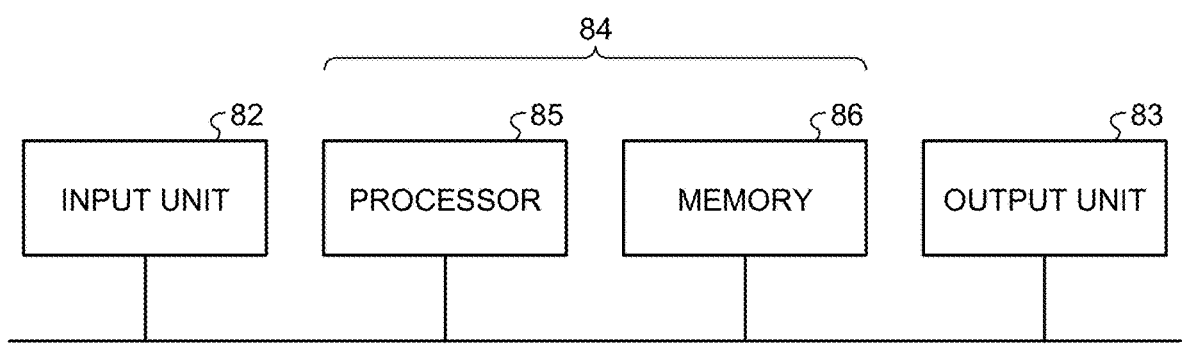
FIG. 26 is a diagram illustrating a second example configuration of hardware for implementing the numerical control devices of the additive manufacturing systems according to the first through third embodiments.

FIG. 26 is a diagram illustrating a second example configuration of hardware for implementing the numerical control devices 4A, 4B, and 4C of the additive manufacturing systems 1A, 1B, and 1C according to the first through third embodiments. FIG. 26 illustrates a configuration when the functionality of the processing circuitry 81 illustrated in FIG. 25 is implemented in processing circuitry 84 including a processor 85 and a memory 86. The processor 85 is a central processing unit (CPU). The processor 85 may also be a computing unit, a microprocessor, a microcomputer, or a digital signal processor (DSP). The memory 86 is, for example, a non-volatile or volatile memory such as a random access memory (RAM), a read-only memory (ROM), a flash memory, an erasable programmable read-only memory (EPROM), or an electrically erasable programmable read-only memory (EEPROM) (registered trademark).

When the main portion of each of the numerical control devices 4A, 4B, and 4C is implemented in a combination of the processor 85 and the memory 86, the processor 85 executes a control program, which is a program that describes processing for providing operations of components constituting the main portion of the numerical control device 4A, 4B, or 4C. The control program is stored in advance in the memory 86. The processor 85 reads and executes the control program stored in the memory 86 thereby to provide operations of components constituting the main portion of the numerical control device 4A, 4B, or 4C. Note that the main portion of each of the numerical control devices 4A, 4B, and 4C may be implemented such that part of the main portion is implemented in the combination of the processor 85 and the memory 86, and the remainder thereof is implemented in a dedicated hardware element similar to the processing circuitry 81 illustrated in FIG. 25.

The control program has been described as being stored in advance in the memory 86, but is not limited thereto. The control program written into a storage medium readable by a computer system may be provided to a user of the additive manufacturing system 1A, 1B, or 1C, and then be installed on the memory 86 by the user. The storage medium may be a portable storage medium that is a flexible disk, or a flash memory, which is a semiconductor memory. The control program may be installed on the memory 86 from another computer or from a server device via a communication network.

The CAM devices 2A, 2B, and 2C, each of which is a machining program generation device, according to the first through third embodiments can be implemented in hardware similar to the hardware having the configuration illustrated in FIG. 26. An example configuration of the computer system that is the hardware of each of the CAM devices 2A, 2B, and 2C will next be described with reference to FIG. 26. The memory 86 stores in advance a machining program generation program. The machining program generation program describes processing for providing operations of components constituting the main portion of the CAM device 2A, 2B, or 2C. The main portion of the CAM device 2A is a set of the machining path generation unit 11, the energy distribution calculation unit 12, the amount-of-correction calculation unit 13, the machining path correction unit 14, and the machining program conversion unit 15. The main portion of each of the CAM devices 2B and 2C is a set of the machining path generation unit 11 and the machining program conversion unit 15. The processor 85 reads and executes a program stored in the memory 86 thereby to provide operations of components constituting the main portion of each of the CAM devices 2A, 2B, and 2C.

The input unit 82 is a circuit for receiving an input signal for the CAM device 2A, 2B, or 2C from an external device. The output unit 83 is a circuit for outputting a signal generated by the CAM device 2A, 2B, or 2C to an external device. The output unit 83 outputs the machining program 16. The computer system also includes an input device for receiving an input operation of an operator, and a display device that displays information. The operator is a person who performs operation for generating the machining program 16.

The machining program generation program is not limited to one stored in advance in the memory 86. The machining program generation program written into a storage medium readable by a computer system may be provided to a user of the additive manufacturing system 1A, 1B, or 1C, and then be installed on the memory 86 by the user. The storage medium may be a portable storage medium that is a flexible disk, or a flash memory, which is a semiconductor memory. The machining program generation program may be installed on the memory 86 from another computer or from a server device via a communication network.

The information processing device 5B according to the second embodiment can be implemented in hardware similar to the hardware having the configuration illustrated in FIG. 26. An example configuration of the computer system that is the hardware of the information processing device 5B will next be described with reference to FIG. 26. The memory 86 stores in advance an amount-of-correction calculation program. The amount-of-correction calculation program is a program for calculating the amount of correction. The amount-of-correction calculation program describes processing for providing operations of the energy distribution calculation unit 62 and of the amount-of-correction calculation unit 63, which constitute a main portion of the information processing device 5B. The processor 85 executes the amount-of-correction calculation program stored in the memory 86 thereby to provide operations of the energy distribution calculation unit 62 and of the amount-of-correction calculation unit 63.

The input unit 82 is a circuit for receiving an input signal for the information processing device 5B from an external device. The input unit 82 receives the machining program 16. The output unit 83 is a circuit for outputting a signal generated by the information processing device 5B to an external device. The output unit 83 outputs the amount-of-correction data 64. Note that, similarly to the machining program generation program, the amount-of-correction calculation program may be written into a storage medium and provided in such form, or may be installed via a communication network.

The learning device 51 according to the fourth variation of the first embodiment may be a device external to the additive manufacturing system 1A. A learning device 51 that is a device external to the additive manufacturing system 1A can be implemented in hardware similar to the hardware having the configuration illustrated in FIG. 26. An example configuration of the computer system that is the hardware of the learning device 51 will next be described with reference to FIG. 26. The memory 86 stores in advance a learning program that is a program for machine learning. The learning program describes processing for providing operations of the data acquisition unit 54 and of the model generation unit 55, which constitute a main portion of the learning device 51. The processor 85 executes a learning program stored in the memory 86 thereby to provide operations of the data acquisition unit 54 and of the model generation unit 55.

The input unit 82 is a circuit for receiving an input signal for the learning device 51 from an external device. The input unit 82 receives the input data and the shape error information. The output unit 83 is a circuit for outputting a signal generated by the learning device 51 to an external device. The output unit 83 outputs the learned model. Note that the learning program may be written into a storage medium and provided in such form, or may be installed via a communication network, similarly to the machining program generation program or to the amount-of-correction calculation program.

The configuration described in each of the foregoing embodiments is merely an example of various aspects of the present disclosure. The configuration of each of the embodiments can be combined with another known technology. Configurations of different embodiments may be combined together as appropriate. Part of the configuration of each of the embodiments can be omitted and/or modified without departing from the spirit of the present disclosure.

REFERENCE SIGNS LIST

1A, 1B, 1C additive manufacturing system; 2A, 2B, 2C CAM device; 3A, 3B, 3C additive manufacturing apparatus; 4A, 4B, 4C numerical control device; 5B information processing device; 10 CAD model; 11 machining path generation unit; 12, 62, 74 energy distribution calculation unit; 13, 50, 63, 75 amount-of-correction calculation unit; 14 machining path correction unit; 15 machining program conversion unit; 16 machining program; 17 machining program analysis unit; 18 axial command generation unit; 20 laser beam; 21 wire; 22 base material; 23 laser oscillator; 24 fiber cable; 25 machining head; 26 wire spool; 27 wire feed device; 30 drive controller; 31 head driving unit; 32 feeder driving unit; 33 laser output controller; 35 area; 36 spot; 37 shadow; 38 temperature distribution; 40 melt pool; 41 target shape; 42, 44 machining path; 43 bead; 45, 48 table; 46 simulator; 47 angle calculation unit; 51 learning device; 52 model storage unit; 53 inference device; 54, 58 data acquisition unit; 55 model generation unit; 56 reward calculation unit; 57 function update unit; 59 inference unit; 61, 71 axial command correction unit; 64, 76 amount-of-correction data; 72 laser output command generation unit; 73 feed command generation unit; 77 measurement data; 81, 84 processing circuitry; 82 input unit; 83 output unit; 85 processor; 86 memory.

The invention claimed is:

1. An additive manufacturing apparatus for producing a shaped article by adding, to a workpiece, a material melted by emission of a beam, the additive manufacturing apparatus comprising:
   a machining head to emit the beam to the workpiece;
   a feeder to feed the material to a melt pool formed on the workpiece by the emission of the beam;
   a memory; and
   a controller, connected to the memory, to determine a machining path along which the machining head is caused to move with respect to the workpiece, and to output a command to move the machining head, wherein
   the controller outputs the command to move the machining head along the machining path obtained by correction performed based on a moving direction of the machining head, the correction being made for a positional deviation of the melt pool caused by a bias in an energy distribution due to an effect of a shape of a spot of the beam on the workpiece and to an effect of the moving direction.

2. The additive manufacturing apparatus according to claim 1, wherein the controller outputs the command to move the machining head along the machining path obtained by correction performed based on an inclination angle of a machined surface and on the moving direction, the inclination angle being an angle of the machined surface with respect to a reference surface.

3. The additive manufacturing apparatus according to claim 1, wherein the controller is configured to:
   determine the machining path by analysis of a machining program input to the controller,
   generate the command to move the machining head, based on the machining path, and
   determine the command to move the machining head along the machining path obtained by correction, by correcting the command generated.

4. The additive manufacturing apparatus according to claim 3, wherein the controller is configured:
   to calculate an amount of collection representing a direction to shift the machining path by making correction and an amount of shift of the machining path to be caused by the correction, and
   to correct a command based on the amount of correction which has been calculated.

5. The additive manufacturing apparatus according to claim 4, wherein the controller is configured to:
   calculate a reaching energy distribution, the reaching energy distribution being an energy distribution of the beam incident on the work piece, and
   calculate the amount of correction based on pieces of data of the reaching energy distribution, of the moving direction of the machining head, and of a moving speed of the machining head.

6. The additive manufacturing apparatus according; to claim 5, wherein
   the additive manufacturing apparatus comprises a beam source to output the beam, and
   the controller is configured to:
   generate an axial command, a beam output command, and a feed command, the axial command being a command for controlling the machining head, the beam output command being a command for controlling outputting of the beam performed by the beam source, the feed command being a command for controlling feeding of the material performed by the feeder, and
   calculate the reaching energy distribution based on at least one of the beam output command or the feed command.

7. The additive manufacturing apparatus according to claim 6, wherein the controller is configured to:
   adjust the beam output command and the feed command based on a result of measurement of a status of machining operation performed by the additive manufacturing apparatus, and
   calculate the reaching energy distribution that takes into consideration the beam output command adjusted or the feed command adjusted.

8. An additive manufacturing system comprising:
   an additive manufacturing apparatus to produce a shaped article by adding, to a workpiece, a material melted by emission of a beam; and
   a machining program generator including a memory and a processor that executes computer instructions in the memory to generate a machining program based on geometrical data of the shaped article, wherein
   the additive manufacturing apparatus includes
   a machining head to emit the beam to the workpiece;
   a feeder to feed the material to a melt pool formed on the workpiece by the emission of the beam,
   a controller memory, and
   a controller, connected to the controller memory to determine, by analysis of the machining program, a machining path along which the machining head is caused to move with respect to the workpiece, and to output a command to move the machining head, and
   the controller outputs a command to move the machining head along the machining path obtained by correction performed based on a moving direction of the machining head, the correction being made for a positional deviation of the melt pool caused by a bias in an energy distribution due to an effect of a shape of a spot of the beam on the workpiece and to an effect of the moving direction.

9. The additive manufacturing system according to claim 8, wherein
   the processor of the machining program generator executes instructions stored in the memory to perform:
   generating the machining path by analysis of the geometrical data,
   converting the machining path into the machining program, and
   correcting the machining path based on the moving direction of the machining head,
   the converting converts the machining path obtained by the correcting into the machining program, and
   the controller generates a command to move the machining head along the machining path obtained by correction, based on the machining program obtained from the converting.

10. The additive manufacturing system according to claim 9, wherein
    the processor of the machining program generator executes instructions stored in the memory to further perform:
    calculating an amount of correction representing a direction to shift the machining path by making correction and an amount of shift of the machining path to be caused by the correction, and the correcting corrects the machining path based on the amount of correction calculated by the calculating.

11. The additive manufacturing system according to claim 10, wherein the calculating the amount of correction calculates the amount of correction based on input data, the input data being pieces of data of a reaching energy distribution, of the moving direction of the machining head, and of a moving speed of the machining head, the reaching energy distribution being an energy distribution of the beam incident on the workpiece.

12. The additive manufacturing system according to claim 11, wherein the processor of the machining program generator executes instructions stored in the memory to further perform:

calculating the reaching energy distribution.

13. The additive manufacturing system according to claim 12, wherein parameters used in the calculating of the reaching energy distribution include an outgoing energy distribution, the outgoing energy distribution being an energy distribution of the beam emitted from the machining head.

14. The additive manufacturing system according to claim 12, wherein the material is a wire, and parameters used in the calculating of the reaching energy distribution include a parameter relating to the wire.

15. The additive manufacturing system according to claim 10, wherein the calculating the amount of correction calculates the amount of correction based on input data, the input data being pieces of data of an angle formed by a feed direction of the material and the moving direction of the machining head, and of a moving speed of the machining head.

16. An additive manufacturing method for producing a shaped article by adding, to a workpiece, a material melted by emission of beam by an additive manufacturing apparatus including a machining head that emits the beam to the workpiece, the additive manufacturing method comprising:

determining a machining path along which the machining head is caused to move with respect to the workpiece; and outputting a command to move the machining head along the machining path obtained by correction performed based on a moving direction of the machining head, the correction being made for a positional deviation of a melt pool caused by a bias in an energy distribution due to an effect of a shape of a spot of the beam on the workpiece and to an effect of the moving direction.

17. A non-transitory storage medium storing a machining program generation program for causing a computer to function ac the machining program generator included in the additive manufacturing system according to claim 8, the machining program generation program causing the computer to perform:

generating a machining path along which the machining head is caused to move with respect to a workpiece by analysis of geometrical data of a shaped article;

correcting the machining path based on a moving direction of the machining head, the correction being made for a positional deviation of the melt pool caused by a bias in an energy distribution due to an effect of a shape of a spot of the beam on the workpiece and to an effect of the moving direction; and converting the machining path obtained by correction into a machining program.

18. A learning device for generating a learned model for use in inference of an amount of correction to a machining path by the additive manufacturing system according to claim 11, the learning device comprising:

a memory storing a program including computer instructions; and a processor which executes the computer instructions to cause;

obtaining input data and the amount of correction; and generating the learned model using a dataset generated based on the input data and on the amount of correction.

19. A learning device for generating a learned model for use in inference of an amount of correction to a machining path by the additive manufacturing system according to claim 15, the learning device comprising:

memory storing a program including computer instructions; and a processor which executes the computer instructions to cause:

obtaining input data and the amount of correction; and generating the learned model using a dataset generated based on the input data and on the amount of correction.

20. A learning device for generating a learned model for use in inference of an amount of correction to a machining path by the additive manufacturing system according to claim 10, the learning device comprising:

a memory storing a program including computer instructions; and a processor winch executes the computer instructions to cause:

obtaining input data and the amount of correction; and generating the learned model using a dataset generated based on the input data and on the amount of correction.

* * * * *